United States Patent [19]
Newkirk et al.

[11] Patent Number: 5,848,349
[45] Date of Patent: *Dec. 8, 1998

[54] METHOD OF MODIFYING THE PROPERTIES OF A METAL MATRIX COMPOSITE BODY

[75] Inventors: Marc Stevens Newkirk; Andrew Willard Urquhart; Michael Kevork Aghajanian, all of Newark, Del.; Mark Gordon Mortenson, North East, Md.; Vilupanur Alwar Ravi, Bear; Alan Scott Nagelberg, Wilmington, both of Del.

[73] Assignee: Lanxide Technology Company, LP, Newark, Del.

[*] Notice: The term of this patent shall not extend beyond the expiration date of Pat. No. 5,301,738.

[21] Appl. No.: 356,334

[22] PCT Filed: Jun. 25, 1993

[86] PCT No.: PCT/US93/06065

§ 371 Date: Feb. 3, 1995

§ 102(e) Date: Feb. 3, 1995

[87] PCT Pub. No.: WO94/00610

PCT Pub. Date: Jan. 6, 1994

[51] Int. Cl.⁶ .................................................. B22F 3/26
[52] U.S. Cl. ................................ 419/10; 419/45; 419/46; 419/47
[58] Field of Search ................................ 419/10, 47, 46, 419/45

[56] References Cited

U.S. PATENT DOCUMENTS

| | | | |
|---|---|---|---|
| 918,069 | 4/1909 | Marius | 164/112 |
| 3,031,340 | 4/1962 | Girardot | 117/118 |
| 3,149,409 | 9/1964 | Maruhn | 29/156.5 |
| 3,364,976 | 1/1968 | Reding et al. | 164/63 |
| 3,396,777 | 8/1968 | Reding, Jr. | 164/97 |

(List continued on next page.)

FOREIGN PATENT DOCUMENTS

| | | |
|---|---|---|
| 0071449 | 2/1983 | European Pat. Off. . |
| 0075648 | 4/1983 | European Pat. Off. . |
| 0094353 | 11/1983 | European Pat. Off. . |
| 0115742 | 8/1984 | European Pat. Off. . |
| 0337034 | 10/1989 | European Pat. Off. . |
| 0340957 | 11/1989 | European Pat. Off. . |
| 0364963 | 4/1990 | European Pat. Off. . |
| 46-26205 | 7/1971 | Japan . |
| 609568 | 6/1983 | Japan . |
| 0144441 | 8/1983 | Japan . |
| 2156718 | 10/1985 | United Kingdom . |
| 9112350 | 8/1991 | WIPO . |
| 9200933 | 1/1992 | WIPO . |
| 9318877 | 9/1993 | WIPO . |

OTHER PUBLICATIONS

X. S. Ning, T. Okamoto, Y. Miyamoto, A. Koreeda and K. Suganuma, "Reaction Chemistry at Joined Interfaces Between Silicon Nitride and Aluminum", The Institute of Scientific and Industrial Research, Journal of Materials Science, vol. 26 (1991), pp. 4142–4149.

(List continued on next page.)

*Primary Examiner*—Charles T. Jordan
*Assistant Examiner*—Daniel Jenkins
*Attorney, Agent, or Firm*—Jeffrey R. Ramberg

[57] ABSTRACT

The present invention relates to modifying the properties of a metal matrix composite body by a post formation process treatment and/or a substantially contiguous modification treatment. The post formation process treatment may be applicable to a variety of metal matrix composite bodies produced by various techniques, and is particularly applicable to modifying the properties of a metal matrix composite body produced by a spontaneous infiltration technique. The substantially contiguous modification process may also be used primarily in conjunction with metal matrix composite bodies produced according to a spontaneous infiltration technique. Particularly, at least a portion of the matrix metal of the metal matrix composite body and/or the filler material of the metal matrix composite body is modified or altered during and/or after the formation process.

52 Claims, 11 Drawing Sheets

U.S. PATENT DOCUMENTS

| | | | |
|---|---|---|---|
| 3,718,441 | 2/1973 | Landingham | 29/182.1 |
| 3,864,154 | 2/1975 | Gazza et al. | 29/123 |
| 3,868,267 | 2/1975 | Gazza et al. | 117/22 |
| 3,915,699 | 10/1975 | Umehara et al. | 75/208 |
| 3,969,553 | 7/1976 | Kondo et al. | 427/299 |
| 3,970,136 | 7/1976 | Cannell et al. | 164/108 |
| 4,082,864 | 4/1978 | Kendall et al. | 427/248 |
| 4,232,091 | 11/1980 | Grimshaw et al. | 428/472 |
| 4,254,621 | 3/1981 | Nagumo | 164/97 |
| 4,341,823 | 7/1982 | Sexton et al. | 427/404 |
| 4,376,803 | 3/1983 | Katzman | 428/408 |
| 4,376,804 | 3/1983 | Katzman | 428/408 |
| 4,450,207 | 5/1984 | Donomoto et al. | 428/614 |
| 4,473,103 | 9/1984 | Kenney et al. | 164/97 |
| 4,605,440 | 8/1986 | Halverson et al. | 75/238 |
| 4,630,665 | 12/1986 | Novak, Jr. et al. | 164/97 |
| 4,657,065 | 4/1987 | Wada et al. | 164/461 |
| 4,662,429 | 5/1987 | Wada et al. | 164/461 |
| 4,673,435 | 6/1987 | Yamaguchi et al. | 75/235 |
| 4,702,770 | 10/1987 | Pyzik et al. | 75/236 |
| 4,713,111 | 12/1987 | Cameron et al. | 75/68 |
| 4,718,941 | 1/1988 | Halverson et al. | 75/236 |
| 4,731,298 | 3/1988 | Shindo et al. | 428/611 |
| 4,753,690 | 6/1988 | Wada et al. | 148/11.5 |
| 4,777,014 | 10/1988 | Newkirk et al. | 419/12 |
| 4,777,097 | 10/1988 | Kubo et al. | 428/614 |
| 4,802,524 | 2/1989 | Donomoto | 164/97 |
| 4,806,508 | 2/1989 | Dwivedi | 501/94 |
| 4,808,558 | 2/1989 | Park | 501/94 |
| 4,818,734 | 4/1989 | Kantner et al. | 501/128 |
| 4,828,008 | 5/1989 | White et al. | 164/66.1 |
| 4,834,938 | 5/1989 | Pyzik et al. | 419/6 |
| 4,851,375 | 7/1989 | Newkirk et al. | 501/88 |
| 4,871,008 | 10/1989 | Dwivedi et al. | 164/6 |
| 4,885,130 | 12/1989 | Claar et al. | 419/12 |
| 4,885,131 | 12/1989 | Newkirk | 419/12 |
| 4,915,902 | 4/1990 | Brupbacher et al. | 420/129 |
| 4,915,903 | 4/1990 | Brupbacher et al. | 420/129 |
| 4,915,908 | 4/1990 | Nagle et al. | 420/590 |
| 4,916,029 | 4/1990 | Nagle et al. | 428/614 |
| 4,956,137 | 9/1990 | Dwivedi | 264/60 |
| 4,981,632 | 1/1991 | Claar et al. | 264/60 |
| 5,296,417 | 3/1994 | Claar et al. | 501/87 |
| 5,298,283 | 3/1994 | Rocazella et al. | 427/181 |
| 5,301,738 | 4/1994 | Newkirk et al. | 164/97 |
| 5,316,069 | 5/1994 | Aghajanian et al. | 164/97 |
| 5,329,984 | 7/1994 | Newkirk et al. | 164/98 |

OTHER PUBLICATIONS

F. Delannay, L. Froyen, and A. Deruyttere, "Review: The Wetting of Solids by Molten Metals and Its Relation to the Preparation of Metal–Matrix Composites", Journal of Materials Science, vol. 22, No. 1, pp. 1–16, Jan. 1987.

G. R. Edwards and D. L. Olson, "The Infiltration Kinetics of Aluminum in Silicon Carbide Compacts", Annual Report from Center for Welding Research, Colorado School of Mines, under ONR Contract No. M00014–85–K–0451, DTIC Report AD–A184 682, Jul. 1987.

A. Mortensen, J. A. Cornie, and M. C. Flemings, "Solidification Processing of Metal–Matrix Composites", Journal of Metals, vol. 40, No. 2, pp. 12–19, Feb. 1988.

A. Mortensen, M. N. Gungor, J. A. Cornie, and M. C. Flemings "Alloy Microstructures in Cast Metal Matrix Composites", Journal of Metals, vol. 38, No. 3, pp. 30–35, Mar. 1986.

B. D. Sparks and F. W. Meadus, "The Development of an Infiltrated Lead/Iron Composite Materials for Use as a Non–toxic Bird Shot", Composites, pp. 37–39, Jan. 1978.

METHOD OF MODIFYING THE PROPERTIES OF A METAL MATRIX COMPOSITE BODY

TECHNICAL FIELD

The present invention relates to modifying the properties of a metal matrix composite body by a post formation process treatment and/or a substantially contiguous modification treatment. The post formation process treatment and the substantially contiguous modification treatment may be applicable to a variety of metal matrix composite bodies produced by various techniques, and is particularly applicable to modifying the properties of a metal matrix composite body produced by a spontaneous infiltration technique. Particularly, in any metal matrix composite formation process at least a portion of the matrix metal of the metal matrix composite body and/or the filler material of the metal matrix composite body is modified or altered during and/or after the formation process.

BACKGROUND ART

Composite products comprising a metal matrix and a strengthening or reinforcing phase such as ceramic particulates, whiskers, fibers or the like, show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be less dense than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents. With powder metallurgy techniques, the metal in the form of a powder and the reinforcing material in the form of a powder, whiskers, chopped fibers, etc., are admixed and then either cold-pressed and sintered, or hot-pressed. The maximum ceramic volume fraction in silicon carbide reinforced aluminum matrix composites produced by this method has been reported to be about 25 volume percent in the case of whiskers, and about 40 volume percent in the case of particulates.

The production of metal matrix composites by powder metallurgy techniques utilizing conventional processes imposes certain limitations with respect to the characteristics of the products attainable. The volume fraction of the ceramic phase in the composite is limited typically, in the case of particulates, to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136, granted Jul. 20, 1976, to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of difficulties in infiltrating a large mat volume. Still further, molds are required to contain the molten metal under pressure, which adds to the expense of the process. Finally, the aforesaid process, limited to infiltrating aligned particles or fibers, is not directed to formation of aluminum metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, and/or the coatings can degrade the filler, and/or the matrix contains lithium which can affect the matrix properties.

U.S. Pat. No. 4,232,091 to R. W. Grimshaw et al., overcomes certain difficulties in the art which are encountered in the production of aluminum matrix-alumina composites. This patent describes applying pressures of 75–375 $kg/cm^2$ to force molten aluminum (or molten aluminum alloy) into a fibrous or whisker mat of alumina which has been preheated to 700° to 1050° C. The maximum volume ratio of alumina to metal in the resulting solid casting was 0.25/1. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the non-wettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to wet the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites, nor does it suggest the formation of such a composite in, for example, a nitrogen atmosphere.

In addition to application of pressure and wetting agents, it has been disclosed that an applied vacuum will aid the penetration of molten aluminum into a porous ceramic compact. For example, U.S. Pat. No. 3,718,441, granted Feb. 27, 1973, to R. L. Landingham, reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154, granted Feb. 4, 1975, to G. E. Gazza et al., also shows the use of vacuum to achieve infiltration. This patent describes loading a cold-pressed compact of $AlB_{12}$ powder onto a bed of cold- pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

U.S. Pat. No. 3,364,976, granted Jan. 23, 1968, to John N. Reding et al., discloses the concept of creating a self-generated vacuum in a body to enhance penetration of a molten metal into the body. Specifically, it is disclosed that a body, e.g., a graphite mold, a steel mold, or a porous refractory material, is entirely submerged in a molten metal. In the case of a mold, the mold cavity, which is filled with a gas reactive with the metal, communicates with the externally located molten metal through at least one orifice in the mold. When the mold is immersed into the melt, filling of the cavity occurs as the self-generated vacuum is produced from the reaction between the gas in the cavity and the molten metal. Particularly, the vacuum is a result of the formation of a solid oxidized form of the metal. Thus, Reding et al. disclose that it is essential to induce a reaction between gas in the cavity and the molten metal. However, utilizing a mold to create a vacuum may be undesirable because of the inherent limitations associated with use of a mold. Molds must first be machined into a particular shape; then finished, machined to produce an acceptable casting surface on the mold; then assembled prior to their use; then disassembled after their use to remove the cast piece therefrom; and thereafter reclaim the mold, which most likely would include refinishing surfaces of the mold or discarding the mold if it is no longer acceptable for use. Machining of a mold into a complex shape can be very costly and time-consuming. Moreover, removal of a formed piece from a complex-shaped mold can also be difficult (i.e., cast pieces having a complex shape could be broken when removed from the mold). Still further, while there is a suggestion that a porous refractory material can be immersed directly in a molten metal without the need for a mold, the refractory material would have to be an integral piece because there is no provision for infiltrating a loose or separated porous material absent the use of a container mold (i.e., it is generally believed that the particulate material would typically disassociate or float apart when placed in a molten metal). Still further, if it was desired to infiltrate a particulate material or loosely formed preform precautions should be taken so that the infiltrating metal does not displace at least portions of the particulate or preform resulting in a non-homogeneous microstructure.

Accordingly, there has been a long-felt need for a simple and reliable process to produce shaped metal matrix composites which does not rely upon the use of applied pressure or vacuum (whether externally applied or internally created), or damaging wetting agents to create a metal matrix embedding another material such as a ceramic material. Moreover, there has been a long felt need to minimize the amount of final machining operations needed to produce a metal matrix composite body. The present invention satisfies these needs by providing a spontaneous infiltration mechanism for infiltrating a material (e.g., a ceramic material), which is formed into a preform, with molten matrix metal (e.g., aluminum) in the presence of an infiltrating atmosphere (e.g., nitrogen) under normal atmospheric pressures, so long as an infiltration enhancer is present at least at some point during the process. In addition, the present invention permits at least one property of a metal matrix composite body to be modified in a desirable manner such modification occurring substantially contiguously with the formation process and/or during a post-formation process.

Description of Commonly Owned U.S. Patents and Patent Applications

This application is a continuation-in-part of U.S. patent application Ser. No. 07/904,757, filed Jun. 26, 1992, which is a continuation-in-part application of U.S. patent application Ser. No. 07/841,241, filed Feb. 24, 1992, which is a continuation of U.S. patent application Ser. No. 07/520,944, filed May 9, 1990, which is a continuation-in-part of U.S. patent application Ser. No. 07/269,309, filed Nov. 10, 1988, which issued on Mar. 19, 1991, as U.S. Pat. No. 5,000,248, in the names of Marc S. Newkirk et al., and all of which are entitled "A Method of Modifying the Properties of a Metal Matrix Composite Body".

The subject matter of this application is related to that of several co-owned Patents and several copending and co-owned patent applications. Particularly, the patents copending patent applications describe novel methods for making metal matrix composite materials (hereinafter sometimes referred to as "Commonly Owned Metal Matrix Patents and Patent Applications" and Commonly Owned Ceramic Matrix Patents and Patent Applications").

A novel method of making a metal matrix composite material is disclosed in Commonly Owned U.S. patent application Ser. No. 07/049,171, filed May 13, 1987, in the names of White et al., and entitled "Metal Matrix Composites", now U.S. Pat. No. 4,828,008, which issued on May 9, 1989, and which published in the EPO on Nov. 17, 1988, as Publication No. 0 291 441. According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. patent application Ser. No. 07/141,642, filed Jan. 7, 1988, in the names of Michael K. Aghajanian et al., and entitled "Method of Making Metal Matrix Composite With the Use of a Barrier", now U.S. Pat. No. 4,935,055, which issued on Jun. 19, 1990, and which published in the EPO on Jul. 12, 1989, as Publication No. 0 323 945. According to the method of this Aghajanian et al. invention, a barrier means (e.g., particulate titanium diboride or a graphite material such as a flexible graphite tape product sold by Union Carbide under the trade name Grafoil®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008 was improved upon by Commonly Owned and Copending U.S. patent application Ser. No. 07/759,745, filed Sep. 12, 1991, which is a continuation of U.S. patent application Ser. No. 07/517, 541, filed Apr. 24, 1990, now abandoned, which is a continuation of U.S. patent application Ser. No. 07/168,284, filed Mar. 15, 1988, now abandoned, and which published in the EPO on Sep. 20, 1989, as Publication No. 0333629, all in the names of Michael K. Aghajanian and Marc S. Newkirk and all of which are entitled "Metal Matrix Composites and Techniques for Making the Same". In accordance with the methods disclosed in this U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body (e.g., a macrocomposite). Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 07/863,894, filed Apr. 6, 1992, which is a continuation of U.S. patent application Ser. No. 07/521, 043, filed May 9, 1990, now abandoned, which is a continuation-in-part of U.S. patent application Ser. No. 07/484,753, filed Feb. 23, 1990, now abandoned, which is a continuation-in-part of U.S. patent application Ser. No. 07/432,661, filed Nov. 7, 1989, now abandoned, which is a continuation-in-part of U.S. patent application Ser. No. 07/416,327, filed Oct. 6, 1989, now abandoned, which is a continuation-in-part application of U.S. patent application Ser. No. 07/349,590, filed May 9, 1989, now abandoned, which in turn is a continuation-in-part application of U.S. patent application Ser. No. 07/269,311, filed Nov. 10, 1988, now abandoned, all of which were filed in the names of Michael K. Aghajanian et al. and all of which are entitled "A Method of Forming Metal Matrix Composite Bodies By A Spontaneous Infiltration Process, and Products Produced Therefrom." According to these Aghajanian et al. applications, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanlan et al. applications that the spontaneous infiltration behavior should occur in other matrix metal/infiltration enhancer precursor/infiltrating atmosphere systems.

Each of the above-discussed Commonly Owned Metal Matrix Patents and Patent Applications describes methods for the production of metal matrix composite bodies and novel metal matrix composite bodies which are produced therefrom. The entire disclosures of all of the foregoing Commonly Owned Metal Matrix Patents and Patent Applications are expressly incorporated herein by reference.

SUMMARY OF THE INVENTION

A metal matrix composite body can be produced by spontaneously infiltrating a permeable mass of filler material or a preform with a molten matrix metal. The matrix metal in the infiltrated filler material or preform and/or the filler material or the preform may be modified substantially contiguously with infiltration and/or may be modified by a post formation process treatment (i.e., may be modified after infiltration has been achieved). Such modification results in enhanced or improved properties (e.g., improved mechanical properties especially at high temperatures, improved corrosion resistance, improved erosion resistance, etc.) in a formed metal matrix composite. Moreover, metal matrix composites produced by methods other than a spontaneous infiltration process also may be treated in accordance with one or both of the substantially contiguous modification treatment and the post formation process treatment.

To achieve spontaneous infiltration, a permeable mass of filler material or a preform is contacted with an infiltration enhancer and/or infiltration enhancer precursor and/or infiltrating atmosphere, at least at some point during the process, which permits molten matrix metal to spontaneously infiltrate the filler material or preform. In a preferred method for achieving spontaneous infiltration, rather than supplying an infiltration enhancer precursor, an infiltration enhancer may be supplied directly to at least one of the preform and/or matrix metal and/or infiltrating atmosphere. Ultimately, at least during the spontaneous infiltration, the infiltration enhancer should be located in at least a portion of the filler material or preform.

In a preferred embodiment for modifying at least one property of a metal matrix composite, once infiltration (e.g., spontaneous infiltration) into the preform or filler material has been achieved, but prior to the matrix metal solidifying, the matrix metal in the metal matrix composite body is modified. Specifically, at least a portion of the matrix metal is caused to be contacted with a second material such as, for example, a second metal or a precursor to a second metal, which second metal may be in a solid, liquid or vapor state, and which second metal has a composition different from that of the matrix metal. The second material may react with the matrix metal and/or filler material or preform to form one or more desirable reaction products. For example, in the case of a second material comprising a second metal in a liquid phase, the second metal may become interdiffused with the matrix metal, thereby resulting in, for example, the formation of desirable intermetallics due to a reaction between the matrix metal and/or filler with the second metal. Accordingly, in the case of a liquid-phase second metal, it may be preferable for the second metal to be miscible with (e.g., when desirable to form intermetallics) the matrix metal. In this embodiment, it should be understood that modification of the metal matrix composite may occur under processing conditions that are very similar to the process conditions used to form the metal matrix composite body (i.e., achieve metal infiltration) or modification may occur under a set of conditions which are different from those used to form a metal matrix composite. For example, temperature may be increased to cause a reaction to occur which either cannot occur due to thermodynamics or occurs too slowly due to kinetics.

In another preferred embodiment for modifying at least one property of a metal matrix composite, prior to completing infiltration (e.g., spontaneous infiltration) of molten matrix metal into a permeable mass of filler material or a preform, the composition of the matrix metal which continues to infiltrate is changed by adding a second metal (or a precursor to a second metal) thereto, which has a composition which is different from the matrix metal. For example, once molten matrix metal begins to infiltrate a permeable mass of filler material or a preform, a second metal could be added to (e.g., alloyed with) the source of matrix metal (e.g., a reservoir source of matrix metal). The second metal could be any metal which, when combined with the matrix metal, does not adversely affect the infiltration (e.g., spontaneous infiltration) of molten matrix metal and modifies the properties of the metal matrix composite (e.g., the matrix metal in the metal matrix composite, etc.) in a desired manner (e.g., by forming desirable alloy(s) and/or desirable reaction product(s) (e.g., intermetallics, etc.)). Again, in this preferred embodiment, desirable modification of the metal matrix composite may occur under conditions which are quite similar to those conditions used to manufacture the metal matrix composite (i.e., achieve metal infiltration), or the conditions may be modified (e.g., an increase in temperature) to permit desirable reaction and/or amounts of reaction, to occur.

In a further preferred embodiment for modifying at least one property of a metal matrix composite, at least one of the matrix metal and/or filler material or preform in a metal matrix composite is modified substantially contiguously with the infiltration (e.g., spontaneous infiltration) of molten matrix metal into a filler material or preform. In this embodiment, a second material may be admixed at least partially, or substantially completely, with at least a portion of, or substantially all of, the filler material or preform, said second material being reactive with the matrix metal and/or filler material or preform under a specific set of processing conditions. In some cases, the reaction may occur only during formation of the composite body (i.e., during metal infiltration), whereas in other cases reaction may occur only after the formation of the composite body due to a change in processing conditions. Additionally, some reactions may occur both during the metal infiltration process and during a post-processing treatment. For example, the second material may comprise a metal which reacts with molten matrix metal to form desirable reaction products (e.g., alloys or intermetallics) which improve, for example, the high temperature strength, corrosion resistance, erosion resistance, electrical conductivity, etc., of the metal matrix composite. Additionally, the second metal may react with, for example, the filler material or preform, to form one or more desirable reaction product oxide, carbide(s), nitride(s), boride(s), etc. Moreover, the second material may comprise a precursor to a second metal which reacts with, for example, the matrix metal to liberate the second metal which then may behave in a manner similar to that discussed immediately above. Still further, it may be possible to employ as second materials in this embodiment, materials which would otherwise react during the infiltration process. For example, by coating such second materials with one or more other materials (for example, by a sol-gel process, a CVD process, etc.) the coating could protect the substrate second material during the infiltration process, but at an elevated temperature such as might be employed in a post-formation treatment process, the coating could then become non-protective and thereby permit the substrate second material to react with at least one of the filler material or matrix metal contained within the composite body to form one or more desireable alloy(s) and/or reaction product(s).

In another preferred embodiment, infiltration (e.g., spontaneous infiltration) is carried out for a time which is not sufficient to permit molten matrix metal to embed completely the filler material or preform (e.g., at least some porosity is created or formed in the filler material or preform). A second metal which is different in composition from the matrix metal may then be contacted with a surface of the metal matrix composite body which has not undergone complete infiltration. The second metal then infiltrates into the porosity of the metal matrix composite, (e.g., the second metal may alloy with the infiltrated matrix metal and provide a sufficient quantity of alloyed matrix metal to fill substantially completely the porosity in the filler material or preform). Moreover, such filling-in of the porosity should occur at a temperature at or above the liquidus temperature of the matrix metal (and/or alloy of matrix metal and second metal). Accordingly, the metal matrix composite body will be modified by the filling-in of an alloy of matrix metal and second metal into the porosity of a filler material or preform. Such "filling-in" may permit various desirable alloys and/or reaction products to be formed, as discussed above herein.

In another preferred embodiment, a second material such as, for example, a second metal or a precursor to a second metal, which may be in a solid, liquid or vapor-phase, and having a composition which is different from the matrix metal that has infiltrated a filler material or preform, can be contacted with at least a portion of a substantially completely infiltrated filler material or preform, and said second material reacts with at least one of the matrix metal and/or filler material or preform. Specifically, in a preferred method, a second metal or a precursor to a second metal can be transported by matrix metal into contact with the filler material or preform and/or may contact the filler material or preform directly, and thereby react with the filler material or preform to form one or more desirable alloys and/or reaction products. In this preferred method, a reaction product(s) can be formed which undergoes a volumetric expansion relative to the original filler material or preform. Such reaction product typically is formed when the matrix metal is at, above, or slightly below the liquidus temperature which results in matrix metal being displaced from the metal matrix composite body. Accordingly, depending upon the amount of reaction product formed, an overall volume percent of matrix metal in the metal matrix composite body is reduced. For example, the formation of reaction product could be limited to a surface area of the metal matrix composite, thus forming a reaction product surface on a metal matrix composite substrate. Moreover, the formation of a reaction product is not limited to metal matrix composite bodies produced according to a spontaneous infiltration technique. It is conceivable that the formation of reaction product in any system which involves a conversion of matrix metal and/or filler material or preform to a reaction product which then displaces matrix metal can produce desirable results.

In a further preferred embodiment of the present invention, the matrix metal of a formed metal matrix composite may be modified by providing at least one grain refiner within at least a portion of the filler material or preform and/or matrix metal. Specifically, a grain refiner may comprise any material (e.g., metal, oxide, nitride, carbide, etc.) which, under the processing conditions, initiates preferential heterogeneous nucleation of at least one phase, other than the matrix metal phase, within the metallic constituent of the formed metal matrix composite, thus modifying the matrix metal and properties of the metal matrix composite. The grain refiners are typically solid under the processing conditions. In a particularly preferred embodiment, grain refiners may be created by, for example, ball milling a filler material to break off, for example, edges of the filler particulate. Under the processing conditions, these very small filler particles act as nucleation sites for the precipitation of at least one phase, other than the matrix metal phase, within the metallic constituent of the metal matrix composite body. Moreover, rather than creating grain refiners by ball milling the filler material, grain refiners may be added to at least a portion of the filler material or preform and/or matrix metal in order to achieve similar precipitation in the metallic constituent. For example, in the case of an aluminum matrix metal, suitable grain modifiers may comprise alumina, titanium diboride, zirconium diboride, titanium aluminides, aluminum borides, manganese, and the like, and combinations thereof.

It is noted that this application, with regard to the spontaneous infiltration technique, discusses primarily aluminum matrix metals which, at some point during the formation of the metal matrix composite body, are contacted with magnesium, which functions as the infiltration enhancer precursor, in the presence of nitrogen, which functions as the infiltrating atmosphere. Thus, the matrix metal/infiltration enhancer precursor/infiltrating atmosphere system of aluminum/magnesium/nitrogen exhibits spontaneous infiltration. However, other matrix metal/infiltration enhancer precursor/infiltrating atmosphere systems may also behave in a manner similar to the system aluminum/magnesium/ nitrogen. For example, similar spontaneous infiltration behavior has been observed in the aluminum/strontium/nitrogen system; the aluminum/zinc/oxygen system; and the aluminum/calcium/nitrogen system. Accordingly, even though the aluminum/magnesium/nitrogen system is discussed primarily herein, it should be understood that other matrix metal/infiltration enhancer precursor/infiltrating atmosphere systems may behave in a similar manner and are intended to be encompassed by the invention.

When the matrix metal comprises an aluminum alloy, the aluminum alloy is contacted with a preform comprising a filler material (e.g., alumina or silicon carbide) or a filler material, said filler material or preform having admixed therewith, and/or at some point during the process being exposed to, magnesium. Moreover, in a preferred embodiment, the aluminum alloy and/or preform or filler material are contained in a nitrogen atmosphere for at least a portion of the process. The preform will be spontaneously infiltrated and the extent or rate of spontaneous infiltration and formation of metal matrix will vary with a given set of process conditions including, for example, the concentration of magnesium provided to the system (e.g., in the aluminum alloy and/or in the filler material or preform and/or in the infiltrating atmosphere), the size and/or composition of the particles in the preform or filler material, the concentration of nitrogen in the infiltrating atmosphere, the time permitted for infiltration, and/or the temperature at which infiltration occurs. Spontaneous infiltration typically occurs to an extent sufficient to embed substantially completely the preform or filler material.

Definitions

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Different" means a material (e.g., a metal) which does not contain, as a primary constituent, the same material as a comparative material (e.g., in the case of a metal, if the primary constituent of a matrix metal is aluminum, the "different" metal could have a primary constituent of, for example, nickel).

"Filler", as used herein, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, fibers, particulates, fiber mats, chopped fibers, spheres, pellets, tubules, refractory cloths, etc., and may be either dense or porous. "Filler" may also include ceramic fillers, such as alumina or silicon carbide as fibers, chopped fibers, particulates, whiskers, bubbles, spheres, fiber mats, pellets, tubules, refractory cloths, or the like, and coated fillers such as carbon fibers coated with alumina or silicon carbide to protect the carbon from attack, for example, by a molten aluminum matrix metal. Fillers may also include metals.

"Grain Refiner", as used herein, means any material (e.g., metal, oxide, carbide, nitride, etc.) which, under the process conditions, initiates preferential nucleation of at least one phase, other than the matrix metal phase, within a metallic constituent of a metal matrix composite body and wherein such nucleation modifies the matrix metal (e.g., alters the morphology) and thus the properties of the metal matrix composite. Grain refiners can comprise a solid material under the processing conditions.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed as, for example, (1) a reaction product of an infiltration enhancer precursor with an infiltrating atmosphere, (2) a reaction product of the infiltration enhancer precursor and the matrix metal or (3) a reaction product of the infiltration enhancer precursor and the filler material or preform. Moreover, the infiltration enhancer may be supplied directly to at least one of the preform and/or matrix metal and/or infiltrating atmosphere and function in a substantially similar manner to an infiltration enhancer which has formed from a reaction between an infiltration enhancer precursor and another species. Ultimately, at least during the spontaneous infiltration, the infiltration enhancer should be located in at least a portion of the filler material or preform to achieve spontaneous infiltration. The infiltration enhancer may be at least partially reducible by the matrix metal.

"Infiltration Enhancer Precursor" or "Precursor to the Infiltration Enhancer", as used herein, means a material which when used in combination with (1) the matrix metal, (2) the preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or the matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform (such as by reacting with the filler material itself and/or the infiltrating matrix metal) which forms a solid, liquid or gaseous infiltration enhancer in at least a portion of the filler material or preform which enhances wetting.

"Interdiffusion" or "Interdiffused", as used herein, means that there occurs at least partial contact or mixing of a matrix metal with a second or different metal, to result in a new desirable alloy and/or intermetallic.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibit spontaneous infiltration into a preform or filler material. It should be understood that whenever a "/" appears between an exemplary matrix metal, infiltration enhancer precursor and infiltrating atmosphere that the "/" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

"Nonreactive Vessel for Housing Matrix Metal" means any vessel which can house or contain a filler material (or preform) and/or molten matrix metal under the process conditions and not react with the matrix and/or the infiltrating atmosphere and/or infiltration enhancer precursor and/or filler material or preform in a manner which would be significantly detrimental to the spontaneous infiltration mechanism.

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity prior to being infiltrated by the matrix metal. The mass should be sufficiently porous to accommodate spontaneous infiltration of the matrix metal thereinto. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reaction Product", as used herein, means the product of a reaction between: (1) a second (or different) metal (or a precursor to a second metal); or (2) a second material with at least one of: (1) a filler material; (2) a preform; (3) a matrix metal; and/or (4) another different second metal or second material. "Reaction Product" should also be understood as including intermetallic compounds which form as a result of the above-described reaction(s).

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Second Material", as used herein, means a material which may, under certain processing conditions, react with at least one of the matrix metal, filler material and/or preform to produce at least one desirable reaction product in the metal matrix composite, thereby modifying at least one property of the metal matrix composite in a desirable manner. The second material may be admixed in the filler material or preform prior to infiltration of the filler material or preform by the matrix metal. Alternatively, the second material may be provided in the source of matrix metal itself either before, during or after infiltration of the matrix metal into the permeable mass. Still further, the second material may be provided as precursor to a second material which subsequently reacts, decomposes, changes state or phase or is otherwise modified to form the second material. The second material may comprise a metal (in which case the "second metal" may be referred to in the text as a "second metal"), a precursor to a metal, a non-metal which reacts to form other non-metals, etc.

"Spontaneous Infiltration", as used herein, means the infiltration of matrix metal into the permeable mass of filler or preform occurs without requirement for the application of pressure or vacuum (whether externally applied or internally created).

DETAILED DESCRIPTION OF THE INVENTION AND PREFERRED EMBODIMENTS

Figure 1:
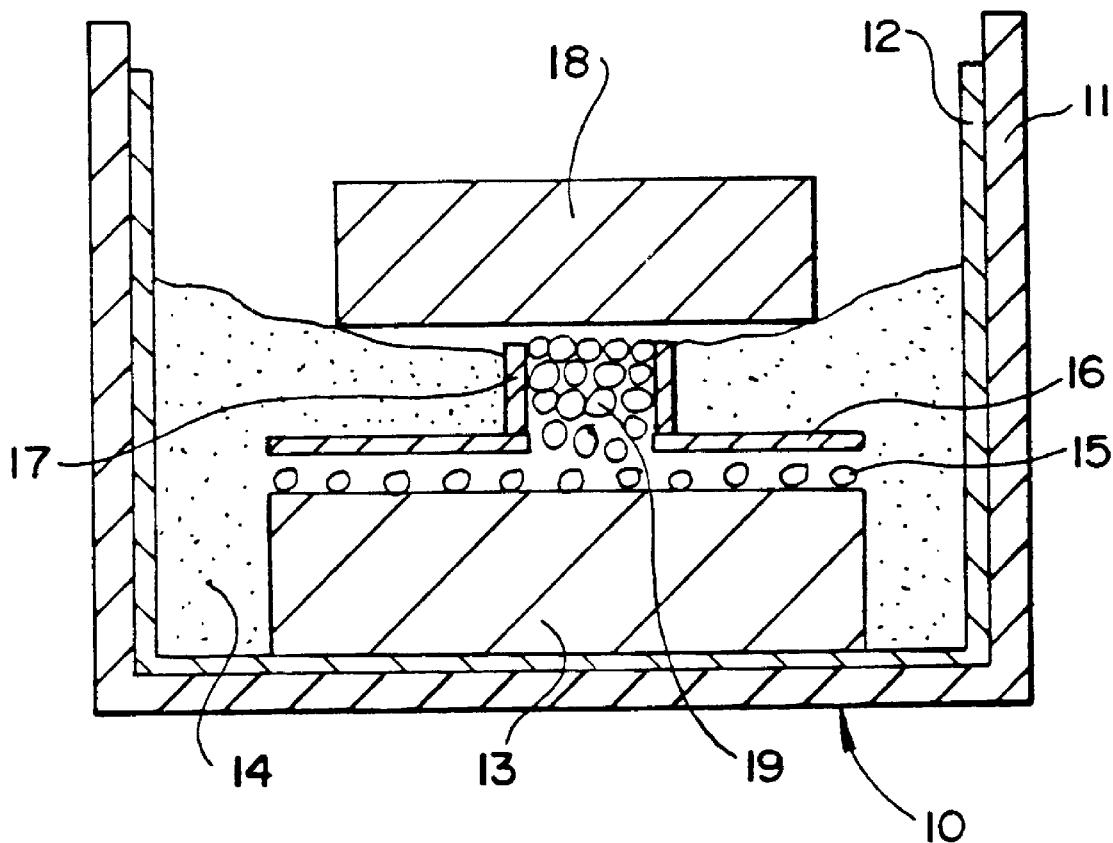
FIG. 1 is a schematic cross-sectional view of a setup for making a metal matrix composite body in accordance with Example 1.

The present invention relates to forming a metal matrix composite body by, for example, spontaneously infiltrating a permeable mass of filler material or preform with molten matrix metal and during and/or subsequent to said forming step modifying at least a portion of the metal matrix composite body.

A metal matrix composite body can be produced by, for example, spontaneously infiltrating a permeable mass of filler material or a preform with a molten matrix metal. The matrix metal in the infiltrated filler material or preform and/or the filler material or the preform may be modified substantially contiguously with infiltration; and/or may be modified by a post formation process treatment (i.e., may be modified after infiltration has been achieved). Such modification results in enhanced or improved properties (e.g., improved mechanical properties, improved corrosion resistance, improved erosion resistance, etc.) In a formed metal matrix composite. Moreover, metal matrix composites produced by methods other than a spontaneous infiltration process also may be treated in accordance with either or both of a substantially contiguous modification treatment or a post formation process treatment.

To achieve spontaneous infiltration, a permeable mass of filler material or a preform is contacted with an infiltration enhancer and/or infiltration enhancer precursor and/or infiltrating atmosphere, at least at some point during the process, which permits molten matrix metal to spontaneously infiltrate the filler material or preform. In a preferred method for achieving spontaneous infiltration, rather than supplying an infiltration enhancer precursor, an infiltration enhancer may be supplied directly to at least one of the preform and/or matrix metal and/or infiltrating atmosphere. Ultimately, at least during the spontaneous infiltration, the infiltration enhancer should be located in at least a portion of the filler material or preform.

In a preferred embodiment for modifying at least one property of a metal matrix composite, once infiltration (e.g., spontaneous infiltration) into the preform or filler material has been achieved, but prior to the matrix metal solidifying, the matrix metal in the metal matrix composite body is modified. Specifically, at least a portion of the matrix metal is caused to be contacted with a second material such as, for example, a second metal or a precursor to a second metal, which second metal may be in a solid, liquid or vapor phase, and which second metal has a composition different from that of the matrix metal. The second material may react with the matrix metal and/or filler material or preform to form one or more desirable reaction products. For example, in the case of a second material comprising a second metal in a liquid phase, the second metal may become interdiffused with the matrix metal, thereby resulting in, for example, the formation of desirable intermetallics due to a reaction between the matrix metal and/or filler material with the second metal. Accordingly, in the case of a liquid-phase second metal, it may be preferable for the second metal to be miscible with (e.g., when desirable to form intermetallics) the matrix metal. In this embodiment, it should be understood that modification of the metal matrix composite may occur under processing conditions that are very similar to the process conditions used to form the metal matrix composite body (i.e., achieve metal infiltration) or modification may occur under a set of conditions which are different from those used to form a metal matrix composite. For example, temperature may be increased to permit a reaction to occur which either cannot occur due to thermodynamics or occurs too slowly due to kinetics.

Moreover, under appropriate reaction conditions, a metal matrix composite may be contacted with a second metal or a precursor to a second metal in a vapor phase, in order to modify the composition of the matrix metal. In certain instances, it may be necessary to tailor the reaction conditions so that the thermodynamics and/or kinetics of reaction between, for example, the matrix metal and the second metal, do not result in matrix metal being exuded from the formed composite body.

In the practice of a preferred embodiment, a stainless steel vessel can be utilized, said stainless steel vessel comprising a container having a bottom plate sealed into position by an annular copper gasket. The stainless steel container preferably contains a refractory support. The stainless steel container may have therein an alumina filler, such as 90 grit, 38 Alundum supplied by Norton Co., with about 50% by volume of a powdered second metal, said powdered second metal being different from the matrix metal. In this embodiment, the matrix metal alloy may be placed on the filler material in the stainless steel can. The matrix metal preferably comprises an aluminum alloy with about 5 percent by weight Mg. In order to spontaneously infiltrate matrix metal into the filler material, the stainless steel vessel should be heated to about 750°–1100° C. in an atmosphere of a nitrogen-containing gas. As the matrix metal spontaneously infiltrates into the permeable filler, it contacts the second metal contained in the filler (e.g., nickel, copper, silicon, magnesium, etc.). The aluminum in the matrix metal may react with, for example, the nickel in the filler to form an intermetallic such as a nickel aluminide in the channels through which the matrix metal passed in order to spontaneously infiltrate the filler. The degree to which any reaction occurs depends upon a number of factors including temperature, the length of exposure at this temperature, and/or the miscibility of the molten metals.

In another preferred embodiment for modifying at least one property of a metal matrix composite, prior to completing infiltration (e.g., spontaneous infiltration) of molten matrix metal into a permeable mass of filler material or a preform, the composition of the matrix metal which continues to infiltrate is changed by adding a second metal (or a precursor to a second metal) thereto, which has a composition which is different from the matrix metal. For example, once molten matrix metal begins to infiltrate a permeable mass of filler material or a preform, a second metal could be added to (e.g., alloyed with) the source of matrix metal (e.g., a reservoir source of matrix metal). The second metal could be any metal which, when combined with the matrix metal, does not adversely affect the infiltration (e.g., spontaneous infiltration) of molten matrix metal and modifies the properties of the metal matrix composite (e.g., the matrix metal in the metal matrix composite, etc.) In a desired manner (e.g., by forming desirable alloy(s) and/or desirable reaction product(s) (e.g., intermetallics, etc.)). Again, in this preferred embodiment, desirable modification of the metal matrix composite may occur under conditions which are quite similar to those conditions used to manufacture the metal matrix composite (i.e., during metal infiltration), or the conditions may be modified (e.g., an increase in temperature) to permit desirable reactions and/or amounts of reactions to occur.

In the practice of a preferred embodiment, an aluminum metal matrix composite body is formed under appropriate reaction conditions by infiltrating a filler material or preform (e.g., silicon carbide) with a molten aluminum matrix metal. Upon substantially complete infiltration of the filler material or preform with molten matrix metal, or upon at least partial infiltration of the filler material or preform with molten aluminum metal, a source of a second metal, for example, silicon, may be added in any appropriate manner to the molten aluminum matrix metal to modify the metallic constituent of the resultant metal matrix composite body.

In a further preferred embodiment for modifying at least one property of a metal matrix composite, at least one of the matrix metal and/or filler material or preform in a metal matrix composite is at least brought into contact with the second material substantially contiguously with the infiltration (e.g., spontaneous infiltration) of molten matrix metal into a filler material or preform. In this embodiment, a second material may be admixed at least partially, or substantially completely, with at least a portion of, or substantially all of, the filler material or preform, said second material being reactive with the matrix metal and/or filler material or preform under a specific set of processing conditions.

In some cases, the reaction may occur only during formation of the composite body (i.e., during metal infiltration), whereas in other cases reaction may occur only after the formation of the composite body due to a change in processing conditions. In other instances, some reaction may occur both during the metal infiltration process and during a postprocessing treatment.

The second material may comprise a metal which reacts with molten matrix metal to form, for example, desirable intermetallics and/or other reaction products (e.g., oxides, carbides nitrides, borides, etc.) which improve, for example, the high temperature strength, corrosion resistance, erosion resistance, electrical conductivity (or resistivity), hardness, etc., of the metal matrix composite. Additionally, the second metal may react with, for example, the filler material or preform, to form one or more desirable reaction product intermetallics, oxides, carbides, nitrides, borides, etc.

Moreover, the second material may comprise a precursor to a second metal which reacts with, for example, the matrix metal to liberate the second metal which then may behave in a manner similar to that discussed immediately above. For example, in the case of an aluminum matrix metal, a second material comprising a precursor to a second metal such as, for example, copper oxide, iron oxide or nickel oxide (i.e., oxides which tend to be less stable than alumina under the reaction conditions) may be mixed into the filler material. Under the processing conditions, the second material would react with, for example, the molten aluminum matrix metal to liberate the second metal into the matrix metal and, in addition, result in, for example, an aluminum oxide reinforcement phase being formed within the composite body. Still further, under the appropriate process conditions, the liberated second metal may react with, for example, the aluminum matrix metal to form one or more desirable intermetallic compounds.

Another example of a second material comprising a precursor to a second metal, in the case of an aluminum matrix metal, is a second material comprising at least one nitride such as silicon nitride (i.e., nitrides which tend to be less stable than aluminum nitride under the reaction conditions) or precursors thereof (e.g., preceramic polymers such as CERASET™ SN preceramic polymer, available from Lanxide Corporation, Newark, Del.) which may be placed into the filler material or preform. Under the processing conditions, such nitride materials could react with, for example, molten aluminum matrix metal which would liberate at least one second metal (e.g., silicon) into the matrix metal and, in addition, result in an aluminum nitride reinforcement phase being present within at least a portion of the composite body.

In yet another example utilizing the case of an aluminum matrix metal, a second material comprising neither a metal nor a precursor to a metal, such as boron carbide, may be placed into the filler material or preform. Under the processing conditions, such boron carbide could react with, for example, molten aluminum matrix metal to form a plurality of reaction products such as aluminum borides, aluminum borocarbides, etc. In a particularly preferred embodiment for applications of the resulting composite material requiring extreme hardness, the filler material or preform comprises both silicon nitride and a carbon source such as elemental carbon or a carbon-containing compound such as boron carbide. Without wishing to be bound by any particular theory or explanation, under the processing conditions utilizing an aluminum matrix metal, the silicon nitride may react with the infiltrated molten aluminum, as shown by Equation 1 below, to produce aluminum nitride plus reduced silicon. The carbon source may then react with the silicon metal to produce silicon carbide. The net reaction may be described by Equation 2 below.

$$4\text{ Al} + \text{Si}_3\text{N}_4 \rightarrow 4\text{ AlN} + 3\text{ Si} \qquad (1)$$

$$4\text{ Al} + \text{Si}_3\text{N}_4 + 3\text{ C} \rightarrow 4\text{ AlN} + 3\text{ SiC} \qquad (2)$$

Further examples of desirable second material additions which can be used in combination with an aluminum matrix metal include: titanium dioxide ($TiO_2$), which may result in a plurality of reaction products being formed including $Al_2O_3$ and Al-Ti intermetallics; mixtures of materials including $Si_3N_4$ with $MoO_3$, which may result in the formation of, for example, AlN, $Al_2O_3$, $MoSi_2$, etc.; mixtures of materials including $SiO_2$ with $MoO_3$, which may result in the formation of, for example, $Al_2O_3$ and $MoSi_2$; and $TiO_2$ with $Si_3N_4$, which may result in the formation of $Al_2O_3$, AlN, TiN, Al-Ti intermetallics, etc. Further examples of desirable precursors to second materials which could be added to a permeable mass to use in combination with an aluminum matrix metal include mullite ($Al_6Si_2O_{13}$) and aluminum titanate ($Al_2TiO_5$). Under the appropriate processing conditions, mullite may decompose to a substance comprising as a second material, silicon dioxide ($SiO_2$). Likewise, aluminum titanate may decompose to a substance comprising as a second material, titanium dioxide ($TiO_2$). Various other combinations of materials should be readily apparent to those of ordinary skill in the art. Specifically, any combination of materials which when subjected to the appropriate reaction conditions may react to form reaction products which desirably impact a composite body are also the subject of this preferred embodiment.

When a second material is added to a filler material or preform, the volume percent of second material added can vary over a wide range depending on a number of different considerations. For example, if the metal matrix composite formation conditions had an upper limit on the amount of filler material that could be infiltrated successfully by a matrix metal, however such upper limit did not permit the metal matrix composite body to function in a commercially acceptable manner, then an appropriate amount of a second material could be added to the filler material or preform to result in an effective increase in the volume percent of reinforcement in a metal matrix composite body due to the formation of reaction product. Moreover, if a substantial amount of an appropriate second material was added to a filler material or preform, and a sufficient amount of, for example, matrix metal was present to react with such second material, the amount of reaction product formed could cause the reaction product to form an at least partially, or substantially completely, interconnected reaction product matrix. Still further, in some cases it may be desirable for only a small amount of reaction product to be formed. Accordingly, only a small amount of second material would need to be added to the filler material or preform.

As discussed above herein, in some cases it may be desirable to utilize a second material which is substantially non-reactive with the matrix metal and/or filler material under the infiltration conditions, but reacts readily when one or more of the processing conditions required to achieve infiltration are changed. For example, the second material may comprise a second metal which may be admixed with the filler material or preform prior to infiltration or may be added to or admixed with the source of matrix metal either prior to, during or subsequent to infiltration. In this manner, a metal matrix composite body may be fabricated which comprises the second metal in substantially unreacted form. Upon changing the process conditions (for example, increasing the temperature above the temperature employed for infiltration), however, the second metal within the formed metal matrix composite body may react with at least one of the filler material or matrix metal within the composite body to form a reaction product which may include, for example, one or more intermetallic compounds. Similarly, the second material may comprise a precursor to a second metal or other materials such as the above-described boron carbide, etc., admixed at least partially or substantially completely within the filler material or preform which is to be infiltrated. The filler material or preform containing this second material may then be infiltrated with molten matrix metal without significant reaction of the second material to form a metal matrix composite body comprising the substantially unreacted second material. The formed composite body may then be raised to a temperature above the infiltration temperature to react the second material contained within the metal matrix composite body with at least one of the filler material and the matrix metal contained within the composite to form at least one reaction product which may comprise, for example, one or more intermetallic or ceramic compounds. Furthermore, it may be possible to employ as second materials in this embodiment, materials which would otherwise react during the infiltration process or may react too rapidly during post-treatment processing. For example, by coating such second materials with one or more other materials (for example, by a sol-gel process, chemical vapor deposition or any other appropriate means) such as, for example, with a colloidal ceramic (e.g., colloidal alumina) the coating could protect the substrate second material during the infiltration process, but at an elevated temperature such as might be employed in a post-formation treatment process, the coating could then become non-protective and thereby permit the substrate second material to react with at least one of the filler material or matrix metal contained within the composite body to form one or more desireable alloy(s) and/or reaction product(s). Through the use of such a coating process, the number of desirable second materials available for use in the process is expanded.

In the case of spontaneous infiltration, useful amounts of second material added to a filler material prior to infiltration typically range between at least about 2 percent by volume of the filler material or preform to as much as about 90 percent or more by volume.

Still further, in some cases the second material may be the only material that is to be infiltrated. In these instances, the second material, in some cases, may be at least partially reactive during the infiltration conditions, but not fully react with, for example, matrix metal until the infiltrated material is subjected to higher temperatures and/or longer times. Accordingly, both thermodynamics and kinetics need to be considered when utilizing a second material in this manner. By selecting appropriate combinations of matrix metal, second material and processing conditions, desirable metal matrix composite bodies may be produced.

In certain cases where a reaction product is formed subsequent to substantially complete infiltration of a filler material mixture or preform, the reaction product, in combination with any liberated components (e.g., metal(s)) into the matrix metal, may actually occupy a smaller volume than the materials which reacted to form the reaction product(s). In such cases, it may be desirable to contact the formed metal matrix composite with a source of additional metal. Specifically, if porosity was not a desired constituent in the formed metal matrix composite, then the source of additional metal could flow into the already existing metallic constituent and/or resupply or replenish any metallic constituent used to form reaction product. The source of additional metal could have a composition which was substantially the same as, or substantially different from, the composition of the metallic constituent of the formed metal matrix composite body. It has been discovered that the amount of additional metal supplied and the precise location of the additional matrix metal can favorably influence the resultant metal matrix composite body, as shown in some of the Examples appended hereto. It has also been discovered that when it is necessary to employ an additional source of metal which is substantially different from the existing or desired metallic constituent of the formed metal matrix composite body to avoid porosity formation, for example, during a post-process treatment, it may be particularly desirable to use only as much additional metal as is required to accomplish the desired objective. Specifically, an excessive quantity of additional metal may modify the chemical composition of the metallic matrix beyond what is desired.

Additionally, it has been discovered that the second material may comprise a material such as, for example, colloidal alumina, which facilitates the binding or rigidizing a preform or filler material, as well as reacting with at least one of the constituents of the matrix metal and/or the filler material or preform to modify the metallic constituent of the metal matrix composite.

In another preferred embodiment, infiltration (e.g., spontaneous infiltration) is carried out for a time which is not sufficient to permit molten matrix metal to embed completely the filler material or preform (e.g., at least some porosity is created or formed in the filler material or preform). Alternatively, a substantially completely infiltrated metal matrix composite body may be contacted with, for example, a leachant, to remove a desired amount of matrix metal, thus creating at least some porosity in the filler material or preform. A second metal which is different in composition from the matrix metal may then be contacted with a surface of the metal matrix composite body which has not undergone complete infiltration. The second metal then infiltrates into the porosity of the metal matrix composite (e.g., the second metal may alloy with the infiltrated matrix metal and provide a sufficient quantity of alloyed matrix metal to fill substantially completely the porosity in the filler material or preform). Moreover, such filling-in of the porosity should occur at a temperature at or above the liquidus temperature of the matrix metal (and/or alloy of matrix metal and second metal). Accordingly, the metal matrix composite body will be modified by the filling-in of an alloy of matrix metal and second metal into the porosity of a filler material or preform. Such "filling-in" may permit various desirable alloys and/or reaction products to be formed, as described above herein.

In another preferred embodiment, a second material such as, for example, a second metal or a precursor to a second metal, which may be in a solid, liquid or vapor phase, and having a composition which is different from the matrix metal that has infiltrated a filler material or preform, can be contacted with at least a portion of a substantially completely infiltrated filler material or preform, and said second material reacts with at least one of the matrix metal and/or filler material or preform. Specifically, in a preferred method, a second metal or a precursor to a second metal can be transported by matrix metal into contact with the filler material or preform, and/or may contact the filler material or preform directly, and thereby react with the filler material or preform to form one or more desirable alloys and/or reaction products. In this preferred method, a reaction product(s) can be formed which undergoes a volumetric expansion relative to the original filler material or preform. Such reaction product typically Is formed when the matrix metal is at, above, or slightly below the liquidus temperature, which results in matrix metal being displaced from the metal matrix composite body. For example, in the case of an aluminum matrix metal and an alumina filler material or preform, the metal content of the metal matrix composite may be reduced by contacting the composite body with a second metal (or a precursor to a second metal), such as magnesium, lithium, strontium, barium, calcium, or the like, under appropriate processing conditions, to form a reaction product which displaces the matrix metal from the composite body in favor of additional reinforcement. Accordingly, depending upon the amount of reaction product formed, an overall volume percent of matrix metal in the metal matrix composite body is reduced. For example, the formation of reaction product could be limited to a surface area of the metal matrix composite, thus forming a reaction product surface on a metal matrix composite substrate. Moreover, the formation of a reaction product is not limited to metal matrix composite bodies produced according to a spontaneous infiltration technique. It is conceivable that the formation of reaction product in any system which involves a conversion of matrix metal and/or filler material or preform to a reaction product, which then displaces the matrix metal, could produce desirable results.

This application discloses primarily methods of modifying the properties of metal matrix composite bodies produced according to a spontaneous infiltration process. However, from the text, it should be understood that some of the modification methods may also be applicable to metal matrix composites made by alternative methods.

Moreover, in any of the above discussed alteration methods, the amount or portion of metal matrix composite body and/or filler material which is to be converted or altered can be varied. Thus, each of the above-discussed processes could be limited to primarily a surface area of a metal matrix composite body, or, if conversion was permitted to occur for a sufficient amount of time, substantially complete conversion of the metal matrix composite body which was formed by spontaneous infiltration (or any other appropriate technique) could occur. Moreover, factors such as temperature, time, atmospheric pressure, atmospheric composition, reacting species, particulate size of the reacting species, etc., could enhance or reduce the rate of conversion of at least a portion of the formed metal matrix composite body. Moreover, depending on a desired result, metal matrix composite bodies may be modified using any combination of the modification techniques discussed herein.

The objective of forming a heat treatable matrix metal in the formed metal matrix composite body may also, in certain circumstances, influence the selection of a second material (or a precursor to a second material). For example, a second material could be added to a preform or a filler material, such second material providing (1) a second metal to the matrix metal which enhances the ability of the matrix metal to be heat-treated and (2) desirable reaction product(s) due to a reaction of, for example, matrix metal with the second material.

In any of the above discussed alteration methods, it is possible to conduct such alterations in an atmosphere which is substantially similar to, or substantially different from, the atmosphere which is present during the formation of the composite bodies. To select an appropriate atmosphere, a number of different criteria should be examined including whether any desirable/undesirable reactions may occur between any constituent in the composite body and the atmosphere, whether the atmosphere favorably/unfavorably influences the formation of any desirable/undesirable reaction products in the composite body, etc. Accordingly, depending on a totality of the circumstances, any one of an oxidizing atmosphere, a reducing atmosphere and/or an inert atmosphere may be used in combination with various preferred embodiments of the invention.

One specific example of utilizing the preferred methods discussed above to modify the properties of a metal matrix composite is to increase the electrical conductivity of the metallic constituent of a metal matrix composite body. Specifically, the presence of high quantities of silicon within an aluminum matrix metal alloy in metal matrix composite bodies may tend to reduce the electrical conductivity of the metal matrix composite body. By modifying the aluminum-silicon matrix metal of, for example, a silicon carbide reinforced aluminum-silicon alloy matrix composite to include such metals as, for example, phosphorous, arsenic and/or antimony, the electrical conductivity of the silicon constituent in the matrix metal may be increased. Under appropriate reaction conditions, any of the preferred methods discussed above may be carried out to modify the matrix metal.

In a still further embodiment, a gaseous means may be used to modify the metallic constituent and thus modify the properties of a formed metal matrix composite. For example, a metal matrix composite may be contacted with, for example, an oxidizing or nitriding or carburizing atmosphere in order to modify (e.g., modify initially or post-treat after infiltrating) the composition of the matrix metal to achieve a desired result. Specifically, a gaseous medium containing an element which reacts with at least a portion of a surface of the formed metal matrix composite body is flowed across the surface of a formed metal matrix composite body, thereby modifying the resultant properties of the formed body.

In a further preferred embodiment of the present invention, the matrix metal of a formed metal matrix composite may be modified by providing at least one grain refiner within at least a portion of the filler material or preform and/or matrix metal. Specifically, a grain refiner may comprise any material (e.g., metal, oxide, nitride, carbide, etc.) which, under the processing conditions, initiates preferential nucleation of at least one phase, other than the matrix metal phase, within the metallic constituent of the formed metal matrix composite, thus modifying the properties of the metal matrix composite. The grain refiners are typically solid under the processing conditions. In a particularly preferred embodiment, grain refiners may be created by, for example, ball milling a filler material to break off, for example, edges of the filler particulate. Under the processing conditions, these very small filler particles act as nucleation sites for the precipitation of at least one phase, other than the matrix metal phase, within the metallic constituent. Moreover, rather than creating grain refiners by ball milling the filler material, grain refiners may be added to at least a portion of the filler material or preform and/or matrix metal in order to achieve similar precipitation in the metallic constituent. For example, in the case of an aluminum matrix metal, suitable grain modifiers may comprise alumina, titanium diboride, zirconium diboride, titanium aluminides, aluminum borides, manganese, and the like, and combinations thereof.

To obtain spontaneous infiltration, an infiltration enhancer and/or infiltration enhancer precursor and/or infiltrating atmosphere are in communication with the filler material or preform, at least at some point during the process, which permits molten matrix metal to spontaneously infiltrate the filler material or preform. Specifically, in order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a preferred embodiment it is possible that the infiltration enhancer precursor can be at least partially reacted with the infiltrating atmosphere such that infiltration enhancer can be formed in at least a portion of the filler material or preform prior to or substantially contiguous with contacting the preform with molten matrix metal (e.g., if magnesium was the infiltration enhancer precursor and nitrogen was the infiltrating atmosphere, the infiltration enhancer could be magnesium nitride which would be located in at least a portion of the filler material or preform).

An example of a matrix metal/infiltration enhancer precursor/infiltrating atmosphere system is the aluminum/magnesium/nitrogen system. Specifically, an aluminum matrix metal can be embedded within a filler material which can be contained within a suitable refractory vessel which, under the process conditions, does not react with the aluminum matrix metal and/or the filler material when the aluminum is made molten. A filler material containing or being exposed to magnesium, and being exposed to, at least at some point during the processing, a nitrogen atmosphere, can be contacted with the molten aluminum matrix metal. The matrix metal will then spontaneously infiltrate the filler material or preform.

Under the conditions employed in the method of the present invention, in the case of an aluminum/magnesium/nitrogen spontaneous system, the filler material or preform should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated filler material or preform to be infiltrated spontaneously with molten matrix metal to form a metal matrix composite body and/or cause the nitrogen to react with an infiltration enhancer precursor to form infiltration enhancer in the filler material or preform, thereby resulting in spontaneous infiltration. The extent or rate of spontaneous infiltration and formation of the metal matrix composite will vary with a given set of process conditions, including magnesium content of the aluminum alloy, magnesium content of the filler material or preform, amount of magnesium nitride in the filler material or preform, the presence of additional alloying elements (e.g., silicon, iron, copper, manganese, chromium, zinc, and the like), average size of the filler material (e.g., particle diameter), surface condition and type of filler material, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1% by weight, and preferably at least about 3% by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the filler material and matrix metal or the filler material alone may result in a reduction in the required amount of magnesium to achieve spontaneous infiltration (discussed in greater detail later herein).

The volume percent of nitrogen in the nitrogen atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the infiltrating atmosphere, thereby resulting in, for example, shorter infiltration times due to a much more rapid rate of infiltration. The infiltrating atmosphere (e.g., a nitrogen containing gas) can be supplied directly to the filler material and/or matrix metal, or it may be produced or result from a decomposition of a material.

The minimum magnesium content required for molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or filler material is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the filler material, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 CRYSTOLON® (99 percent pure silicon carbide from Norton Co.). However, in the presence of magnesium, silicon has been found to promote the infiltration process. As a further example, the amount of magnesium varies if it is supplied exclusively to the filler material. It has been discovered that spontaneous infiltration will occur with a lesser weight percent of magnesium supplied to the spontaneous infiltration system when at least some of the total amount of magnesium supplied is placed in the filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

Further, when infiltrating a permeable filler (e.g., aluminum oxide) utilizing a aluminum/magnesium/nitrogen system a spinel (e.g., $MgAl_2O_4$) can be formed. Thus, when a sufficient amount of magnesium is present, the magnesium can react with an alumina filler if held at a high temperature for a sufficient period of time. The formation of $MgAl_2O_4$ results in the volumetric expansion and reduction of metal, as discussed above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). If the magnesium was applied to a surface of the matrix metal it may be preferred that said surface should be the surface which is closest to, or preferably in contact with, the permeable mass of filler material or vice versa; or such magnesium could be mixed into at least a portion of the filler material. Still further, it is possible that some combination of surface application, alloying and placement of magnesium into at least a portion of the filler material could be used. Such combination of applying infiltration enhancer(s) and/or infiltration enhancer precursor(s) could result in a decrease in the total weight percent of magnesium needed to promote infiltration of the matrix aluminum metal into the filler material, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g. to at least about 5 weight percent; and/or (2) when alloying constituents are mixed with the permeable mass of filler material; and/or (3) when another element such as zinc or iron is present in the aluminum alloy. The temperature also may vary with different filler materials. In general, spontaneous and progressive infiltration will occur at a process temperature of at least about 675° C., and preferably a process temperature of at least about 750° C.–800° C. Temperatures generally in excess of 1200° C. do not appear to benefit the process, and a particularly useful temperature range has been found to be from about 675° C. to about 1200° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable, dependent upon the intended application of the metal matrix composite body. Additionally, electric resistance heating is typically used to achieve the infiltrating temperatures. However, any heating means which can cause the matrix metal to become molten and does not adversely affect spontaneous infiltration is acceptable for use with the invention.

In the present method, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or the preform and/or molten aluminum matrix metal. Although the flow rate of the nitrogen-containing gas is not critical, it is preferred that the flow rate be sufficient to compensate for any nitrogen lost from the atmosphere due to nitride formation in the alloy matrix, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, the ability of the filler material to conform to the matrix metal and the properties sought for the final composite product. For example, when aluminum is the matrix metal, suitable filler materials include (a) oxides, e.g. alumina; (b) carbides, e.g. silicon carbide; (c) borides, e.g. aluminum dodecarboride, and (d) nitrides, e.g. aluminum nitride. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing an appropriate coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of woven mats or continuous filament, such as multifilament tows. Further, the filler material may be homogeneous or heterogeneous.

Certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Commonly Owned U.S. Pat. No. 4,851,375, entitled "Methods of Making Composite Ceramic Articles Having Embedded Filler", which issued on Jul. 25, 1989, in the names of Marc S. Newkirk et al., also exhibit desirable infiltration properties relative to commercially available alumina products. The subject matter of each of these issued Patents is herein expressly incorporated by reference. Specifically, it has been discovered that substantially complete infiltration of a permeable mass of a ceramic or ceramic composite material can occur at lower infiltration temperatures and/or lower infiltration times by utilizing a crushed or comminuted body produced by the method of the aforementioned U.S. Patents.

The size and shape of the filler material can be any that may be required to achieve the properties desired in the composite. Thus, the filler material may be in the form of particles, whiskers, platelets or fibers and mixtures thereof since infiltration is not restricted by the shape of the filler material. Other shapes such as spheres, tubules, pellets, refractory fiber cloth, and the like may be employed. In addition, the size of the material does not limit infiltration, although a higher temperature or longer time period may be needed for complete infiltration of a mass of smaller particles than for larger particles. Further, the mass of filler material (shaped into a preform) to be infiltrated should be permeable (i.e., permeable to molten matrix metal and to the infiltrating atmosphere).

The method of forming metal matrix composites according to the present invention, not being dependent on the use of pressure to force or squeeze molten matrix metal into a mass of filler material, permits the production of substantially uniform metal matrix composites having a high volume fraction of filler material and low porosity. Higher volume fractions of filler material on the order of at least about 50% may be achieved by using a lower porosity initial mass of filler material and particles of varying size. Higher volume fractions also may be achieved if the mass of filler is compacted or otherwise densified provided that the mass is not converted into either a compact with close cell porosity or into a fully dense structure that would prevent infiltration by the molten alloy.

It has been observed that for aluminum infiltration and matrix formation around a ceramic filler, wetting of the ceramic filler by the aluminum matrix metal may be an important part of the infiltration mechanism. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Moreover, it is possible to use a reservoir of matrix metal to assure complete infiltration of the filler material and/or to supply a second metal which has a different composition from the first source of matrix metal. Specifically, in some cases It may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal, so long as an adequate amount of time is given for the mixing to occur. Thus, by using a reservoir metal which is different in composition than the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process as well as being capable of locally inhibiting, stopping, interfering with, preventing, or the like, continued infiltration or any other kind of movement beyond the defined surface boundary of the filler material.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particularly preferred graphite is a graphite tape product that is sold under the trademark Grafoil®, registered to Union Carbide. This graphite tape exhibits sealing characteristics that prevent the migration of molten aluminum alloy beyond the defined surface boundary of the filler material. This graphite tape is also resistant to heat and is chemically inert. Grafoil® graphite material is flexible, compatible, conformable and resilient. It can be made into a variety of shapes to fit any barrier application. However, graphite barrier means may be employed as a slurry or paste or even as a paint film around and on the boundary of the filler material. Grafoil® is particularly preferred because it is in the form of a flexible graphite sheet. In use, this paper-like graphite is simply formed around the filler material.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. The transition metal borides are typically in a particulate form (1–30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatile organic compounds applied as a film or layer onto the external surface of the filler material. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by layering the defined surface boundary with the barrier means. Such layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates upon reaching the defined surface boundary and contacting the barrier means.

The following Examples are intended to further illustrate the invention.

EXAMPLE 1

A filler material mixture was prepared by combining in a plastic jar a mixture of, by weight, about 54.3% 39 CRYS- TOLON® 54 grit silicon carbide (Norton Co., Worcester, Mass.), about 23.3% 39 CRYSTOLON® 90 grit silicon carbide, about 31% 39 CRYSTOLON® 1000 grit silicon carbide, and about 19.3% BLUONIC® A colloidal alumina (Bantrock Industries, Inc., Lively, Va.).

The filler material mixture was roll mixed for about 45 minutes, then poured into a silicone rubber mold with an internal cavity measuring about 7 inches (178 mm) square and about 1.5 inches (38 mm) deep. The rubber mold was vibrated to assist in sedimentation. After vibrating for about 0.5 hour, the excess water on the surface of the formed sediment cast preform was removed with a paper towel. The silicone mold containing the preform was vibrated for approximately an additional hour, then the remaining surface water was removed and the silicone rubber mold was transferred from the vibration table into a freezer. After the residual water in the preform had thoroughly frozen, the silicone rubber mold and its preform were removed from the freezer, and the frozen sediment cast preform was withdrawn from the rubber mold. The preform was placed on a bed of 38 ALUNDUM® 90 grit alumina particulate material and allowed to dry in air at room temperature for about 16 hours.

Referring to FIG. 1, after drying, the sediment cast preform 13, measuring about 7 inches (178 mm) square and about 1.38 inches (35 mm) thick, was transferred to a new bedding of 90 grit alumina supported by a refractory plate and placed into a resistance heated air atmosphere furnace for firing. The furnace temperature was increased from about room temperature to about 1050° C. in a period of about 10 hours. After about 2 hours at about 1050° C., the furnace and its contents were cooled to about room temperature in about 10 hours.

A GRAFOIL® graphite foil (Union Carbide Company, Carbon Products Division, Cleveland, Ohio) box 12 measuring about 8.5 inches (216 mm) square and about 4 inches (102 mm) high was placed into a graphite boat 11 measuring about 9 inches (229 mm) square and about 4 inches (102 mm) high in its interior. The fired sediment cast preform 13 was then placed into the bottom of the graphite foil box 12. A bedding material 14 comprising by weight about 15% borosilicate glass frit (F-69 Fusion Ceramics, Inc., Carrollton, Ohio), about 28.3% El ALUNDUM® 90 grit alumina (Norton Co., Worcester, Mass.), about 28.3% El ALUNDUM® 220 grit alumina, and about 28.4% El ALUNDUM® 500 grit alumina, was placed into the graphite foil box 12 around the fired sediment cast preform 13 to a level substantially flush with the top of the preform. A thin surface layer 15 of −100 mesh magnesium powder (Hart Corp., Tamaqua, Pa.) was sprinkled over the top of the preform 13.

A gating means comprising a graphite ring 17, having an inner diameter measuring about 2.5 inches (64 mm) and a height of about 0.5 inch (13 mm), was centered over an about 2.5 inch (64 mm) diameter hole in an approximately 7 inch (178 mm) square by 14 mil (0.36 mm) thick sheet of graphite foil 16. The graphite ring 17 was then adhered to the graphite foil 16 with a thin layer of an adhesive comprising about 40% volume percent RIGIDLOCK® graphite cement (Polycarbon Corp., Valencia, Calif.) and the balance ethanol. The joined graphite ring and the graphite foil were allowed to dry in air at room temperature for about 4 hours.

The graphite foil and graphite foil ring assembly were then placed onto the layer of −100 mesh magnesium powder 15 in the graphite foil box 12 with the graphite ring 17 facing up. The inside of the graphite ring 17 was then filled with a particulate mixture 19 comprising by weight about 1%−100 mesh magnesium powder, about 1%−325 mesh magnesium powder, about 29% 39 CRYSTOLON® 90 grit silicon carbide, and the balance 39 CRYSTOLON® 54 grit green silicon carbide. Additional bedding material 14 (particulate mixture of alumina and borosilicate glass frit) was then poured into the graphite box 12 on the graphite foil 16 around the graphite ring 17 to a height substantially flush with the top of the graphite ring 17, and somewhat higher out towards the walls of the graphite foil box 12. An ingot of matrix metal 18 weighing about 2965 grams and comprising by weight about 15% Si, 5% Mg, and the balance of aluminum, was placed into the graphite foil box 12 and centered over the graphite ring 17.

The graphite boat 11 and its contents were placed into a resistance heated controlled atmosphere furnace at room temperature. The furnace chamber was evacuated to a vacuum of about 30 inches (762 mm) of mercury and then backfilled with nitrogen gas to establish a gas flow rate of about 4 liters per minute. The furnace temperature was increased to about 200° C. at a rate of about 150° C. per hour. After about 44 hours, at about 200° C., the furnace and its contents were heated to about 825° C. at a rate of about 150° C. per hour while maintaining a nitrogen flow rate of about 4 liters per minute. After maintaining a temperature of about 825° C. for about 18 hours, the temperature was then decreased to about 675° C. at a rate of about 200° C. per hour. At a temperature of about 675° C., the graphite boat and its contents were removed from the furnace and placed onto a water cooled aluminum quench plate. A FEEDOL® 9 particulate hot topping material (Foseco, Inc., Cleveland, Ohio) was poured onto the top of the residual molten matrix metal. An approximately 2 inch (51 mm) thick layer of CERABLANKET® ceramic fiber insulation (Manville Refractory Products, Denver, Colo.) was placed on top of the lay-up, and the graphite boat to further assist in directional solidification. After cooling to substantially room temperature, the lay-up was removed from the graphite boat. The bedding of alumina and glass frit material was removed from around the lay-up with lighter hammer blows to reveal that the matrix metal had infiltrated the sediment cast preform to produce a metal matrix composite body.

The metal matrix composite body was sectioned, mounted, polished, and examined with an optical microscope. It was observed that the matrix metal of the composite contained substantially no $Mg_2Si$ precipitates. Closer examination of the microstructure of the metal matrix composite using an electron microscope and energy-dispersion analysis at about 1500× suggested that the alumina introduced into the preform as colloidal alumina had at least partially reacted with magnesium of the matrix metal to form mixed oxides of aluminum and magnesium.

EXAMPLE 2

The following Example demonstrates a method for modifying the matrix metal within a metal matrix composite body. Specifically, a formed metal matrix composite body was placed into a powder bedding of a second metal, was heated to a temperature below the melting temperature of the matrix metal and was held at the elevated temperature for a time sufficient to allow the matrix metal and the second metal to interdiffuse, thereby altering the chemical composition of the metallic constituent of the resultant metal matrix composite body.

Figure 2:
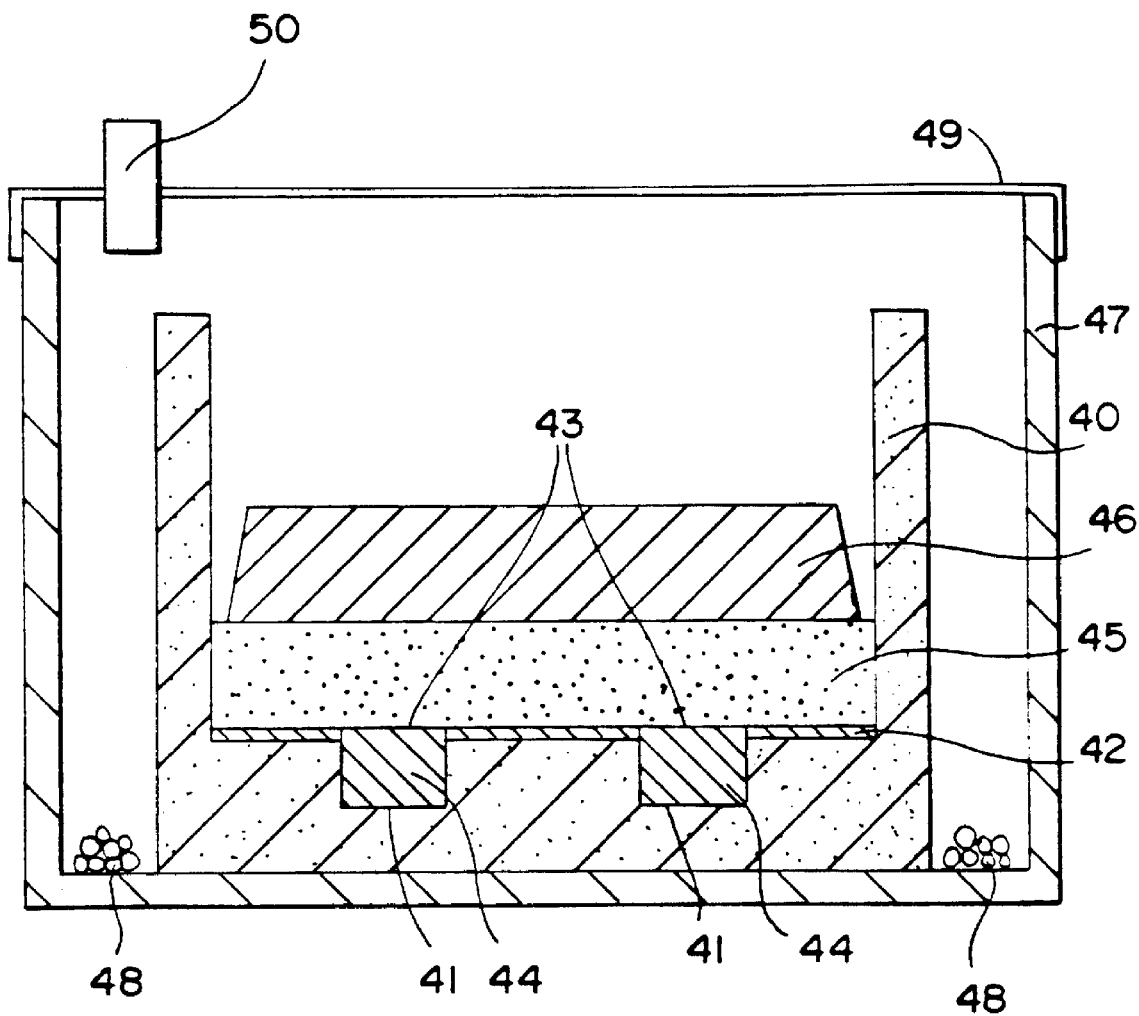
FIG. 2 is a schematic cross-sectional view of a setup for making a metal matrix composite body in accordance with Example 2.

Specifically, FIG. 2 shows a schematic cross-sectional view of the setup used to produce a metal matrix composite sample, as described below. A silica mold 40 was prepared, having an inner cavity measuring about 5 inches (127 mm) long by about 5 inches (127 mm) wide by about 3.25 inches (83 mm) deep, and having five holes 41 in the bottom of the mold, each measuring about 0.75 inches (19 mm) in diameter and about 0.75 inches (19 mm) deep. The mold was formed by first mixing a slurry comprising by weight of about 2.5 parts RANCO-SIL™ 4 −200 mesh silica powder (Ransom & Randolph, Maunee, Ohio), about 1 part NYACOL® 830 colloidal silica (Nyacol Products, Inc., Ashland, Mass.) and about 1.5 parts RANCO-SIL™ A −50 mesh, +100 mesh silica sand (Ransom & Randolph, Maunee, Ohio). The slurry mixture was poured into a rubber mold having a negative shape of the desired inner cavity of the silica mold and placed in a freezer overnight (about 14 hours). The silica mold 40 was subsequently separated from the rubber mold, fired at about 800° C. in an air atmosphere furnace for about 1 hour and cooled to room temperature.

The bottom surface of the formed silica mold 40 was covered with a piece of PERMA FOIL® graphite foil 42 (TTAmerica, Portland, Oreg.), having dimensions of about 5 inches (127 mm) long by about 5 inches (127 mm) wide by about 0.010 inches (0.25 mm) thick. Holes 43, about 0.75 inches (19 mm) in diameter, were cut into the graphite foil to correspond in position to the holes 41 in the bottom of the silica mold 40. The holes 41 in the bottom of the silica mold 40 were filled with matrix metal cylinders 44, measuring about 0.75 inches (19 mm) in diameter by about 0.75 inches (19 mm) thick, having a composition identical to the matrix metal, as described below. About 826 grams of a filler material mixture 45, comprising by weight about 95 percent 38 ALUNDUM® 220 grit alumina (Norton, Co., Worcester, Mass.) and about 5 percent AESAR® −325 magnesium powder (Al Corp./AESAR® Johnson Matthey, Seabrook, N.H.), were prepared in an about 4 liter plastic jar by hand shaking for about 15 minutes. The filler material mixture 45 was then poured into the bottom of the silica mold 40 to a depth of about 0.75 inch (19 mm) and tapped lightly to level the surface of the filler material mixture. About 1220 grams of a matrix metal 46, comprising by weight approximately <0.25% Si, <0.30% Fe, <0.25/% Cu, <0.15% Mn, about 9.5–10.6% Mg, <0.15% Zn, <0.25% Ti and the balance aluminum, were placed on top of the filler material mixture 45 within the silica mold 40. The silica mold 40 and its contents were then placed into a stainless steel container 47, having dimensions of about 10 inches (254 mm) long by about 10 inches (254 mm) wide by about 8 inches (203 mm) high. A titanium sponge material 48, weighing about 15 grams (from Chemalloy Inc., Bryn Mawr, Pa.), was sprinkled around the silica mold 40 in the stainless steel container 47. A sheet of copper foil 49 was placed over the opening of the stainless steel container 47, so as to form an isolated chamber. A nitrogen purge tube 50 was provided through the sheet of copper foil 49, and the stainless steel container 47 and its contents were placed into an air atmosphere resistance heated box furnace.

The furnace was ramped from about room temperature to about 600° C. at a rate of about 400° C./hour with a nitrogen flow rate of about 10 liters/minute (note that the isolated chamber may not be completely gas tight and permit, typically, some nitrogen to escape therefrom), then heated from about 600® C. to about 750° C. at a rate of about 400° C./hour with a nitrogen flow rate of about 2 liters/minute. After holding the system at about 775° C. for approximately 1.5 hours with a nitrogen flow rate of about 2 liters/minute, the stainless steel container 47 and its contents were removed from the furnace. The silica mold 40 was removed from the stainless steel container 47, and a portion of the residual matrix metal was decanted from within the silica mold 40. A room temperature copper chill plate, about 5 inches (127 mm) long by about 5 inches (127 mm) wide by about 1 inch (25 mm) thick, was placed within the silica mold 40 such that it contacted the top portion of the residual matrix metal, to directionally solidify the formed metal matrix composite. At about room temperature, the metal matrix composite was cut with a diamond saw into pieces measuring about 0.63 inch (16 mm) long by about 0.5 inch (13 mm) wide by and about 0.35 inch (9 mm) thick.

Figure 3:
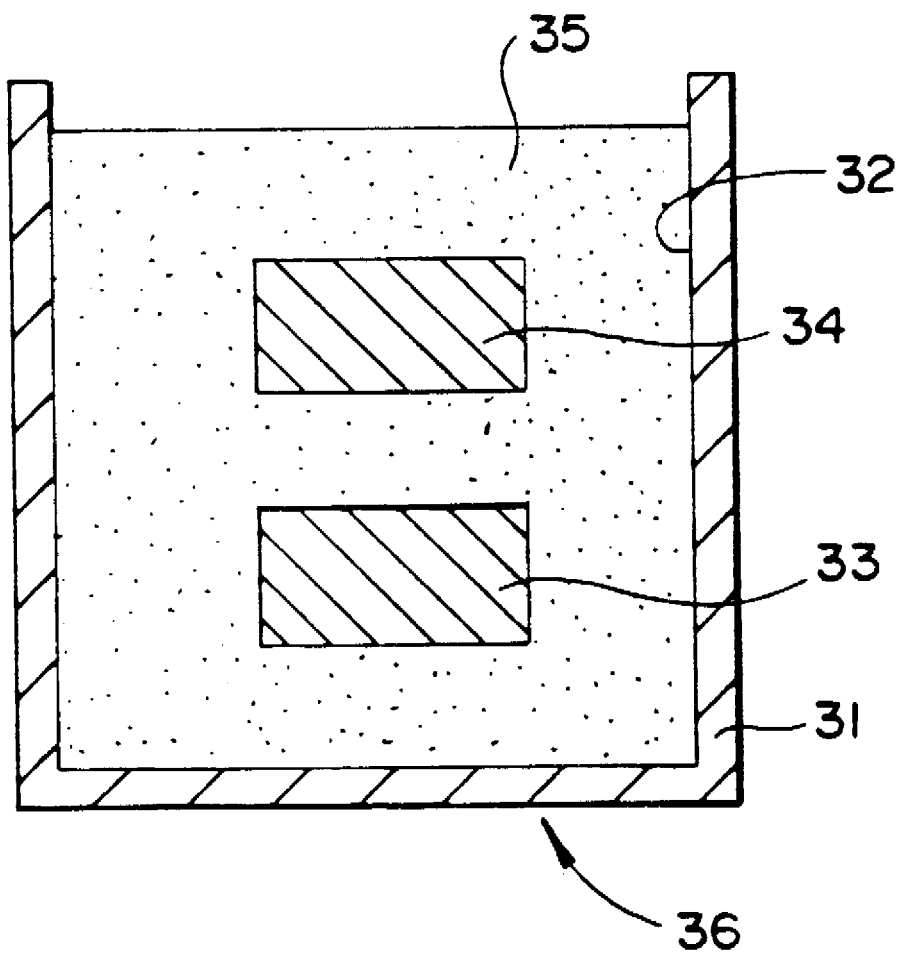
FIG. 3 is a schematic cross-sectional view of a setup for modifying a formed metal matrix composite body in accordance with Example 2.

The formed metal matrix composite body was then subjected to a modifying treatment. Specifically, as shown in FIG. 3, an approximately 0.5 inch (13 mm) layer of −100 mesh copper powder 35 (Consolidated Astronautics, Inc., Saddle Brook, N.J.) was placed into a container 31 made from AISDI Type 304 stainless steel, measuring about 2.25 inches (57 mm) high and having an outer diameter of about 1.5 inches (38 mm) and an inner diameter of about 1.38 inches (35 mm). Prior to placing the copper powder into the mold, a GRAFOIL® graphite foil lining 32 was placed into the stainless steel container 31. A cut piece of the metal matrix composite 33 was placed onto the copper powder 35 in the graphite foil lined stainless steel container. Additional −100 mesh copper powder 35 was placed into the container to surround and cover the metal matrix composite to a level of about 0.5 inch (13 mm) above the top of the composite 33. A second metal matrix composite body 34 was placed in the container and, again, the composite body covered with −100 mesh copper powder 35 to a level of about 0.5 inch (13 mm) above the composite, thus completing the setup 36.

The setup 36 and its contents were placed into a controlled atmosphere furnace at about room temperature, and a flowing argon atmosphere of about 0.5 liters per minute was established with the furnace. The furnace and its contents were heated to about 600° C. in about 3 hours and held at about 600° C. for about 2 hours, then cooled to about room temperature in about 3 hours.

Figure 4:
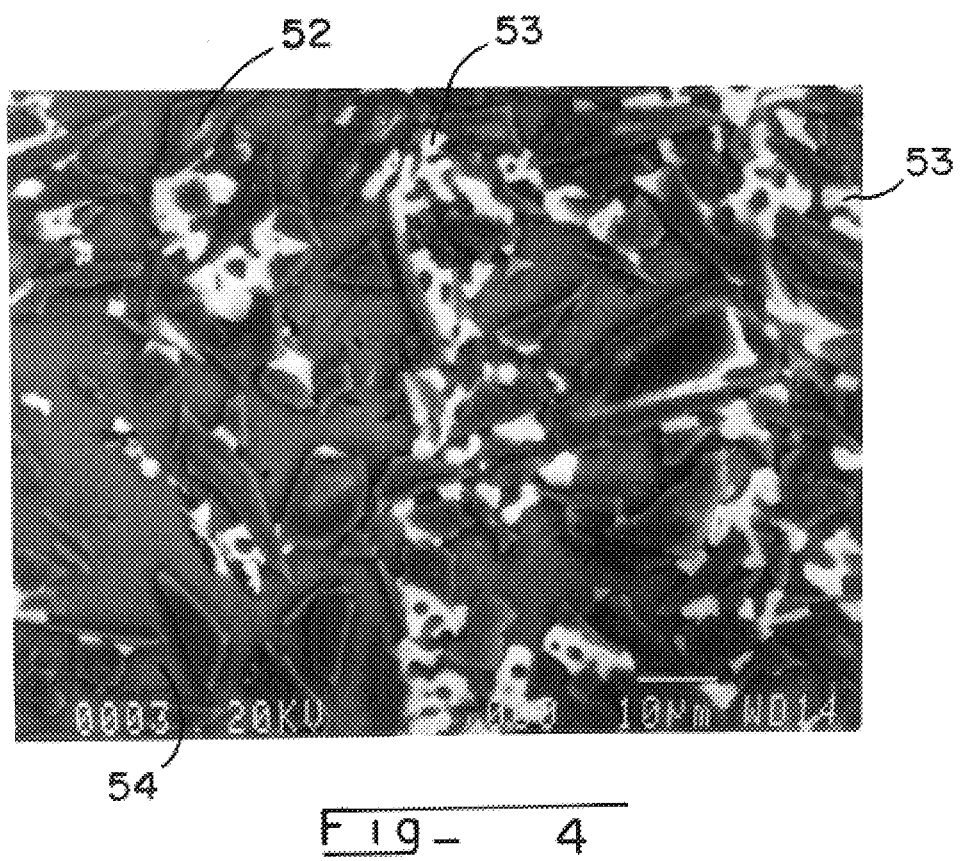
FIG. 4 is a secondary electron image photograph at about 1000× magnification, of the microstructure of the metal matrix composite body as treated in accordance with Example 2.
Figure 5A:
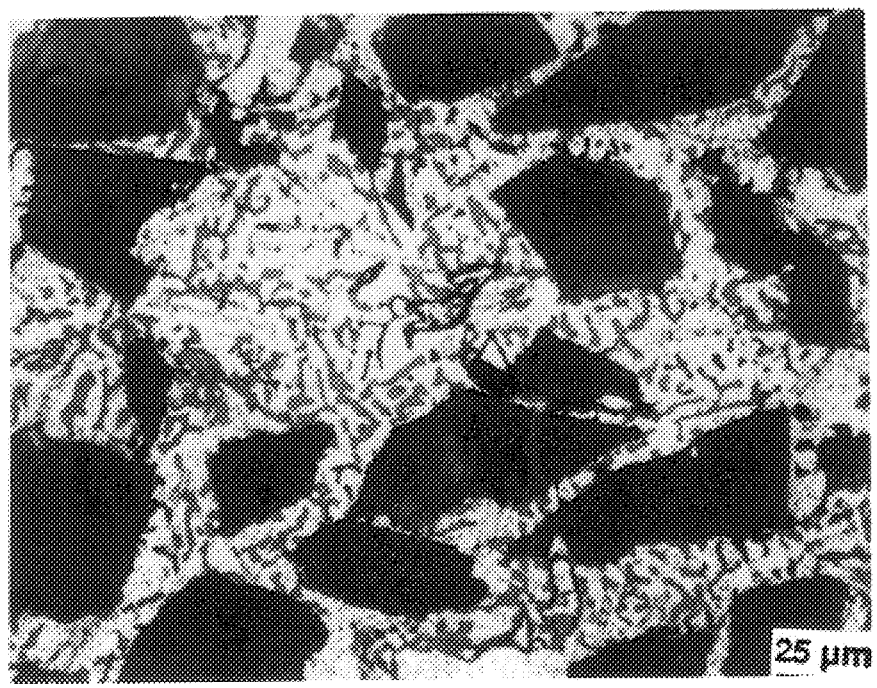
FIGS. 5a, 5b, 5c and 5d are comparative photographs taken at about 400× magnification of the microstructures of the metal matrix composite bodies formed in Example 3.
Figure 5B:
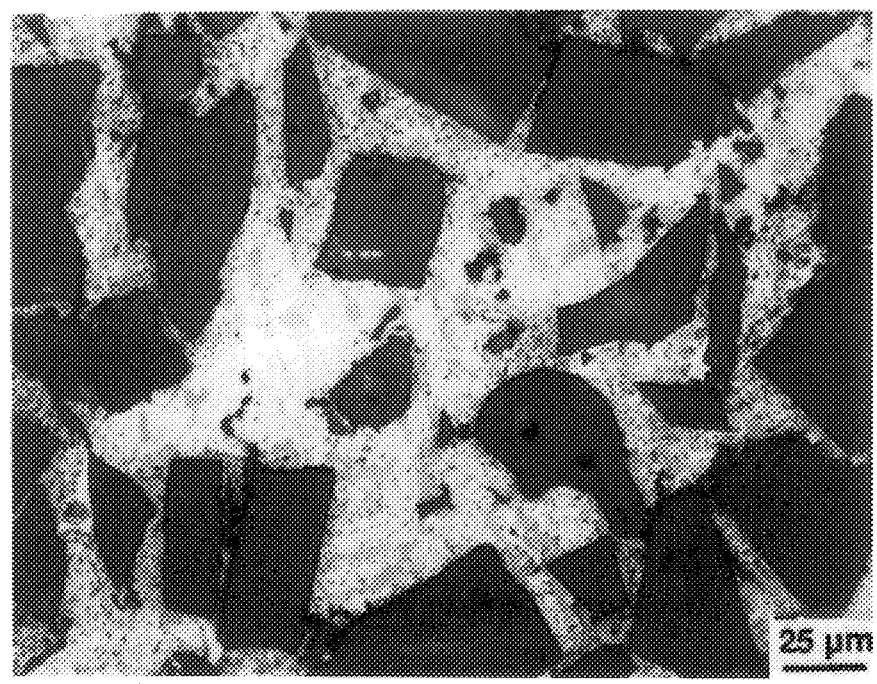
Figure 5C:
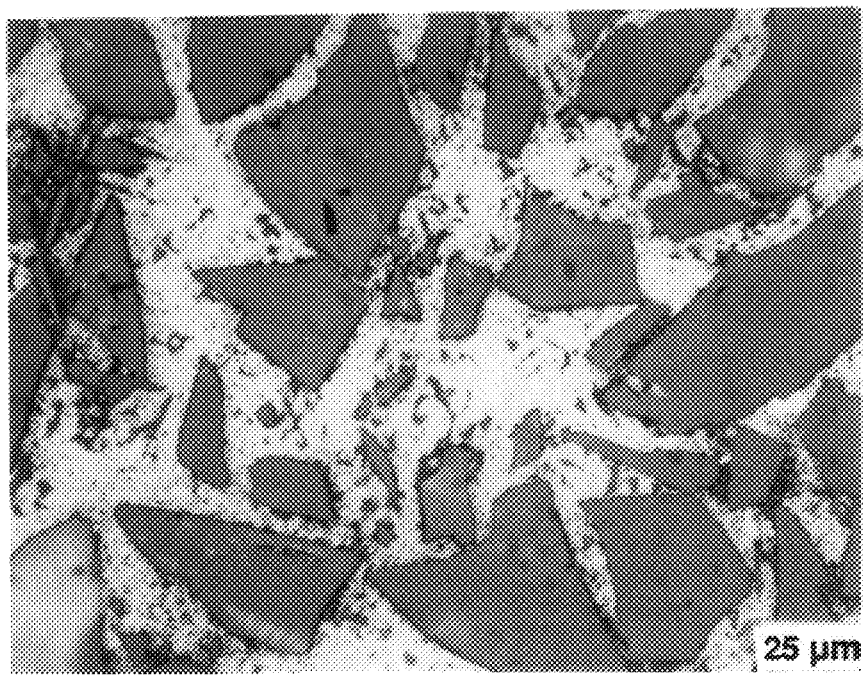
Figure 5D:
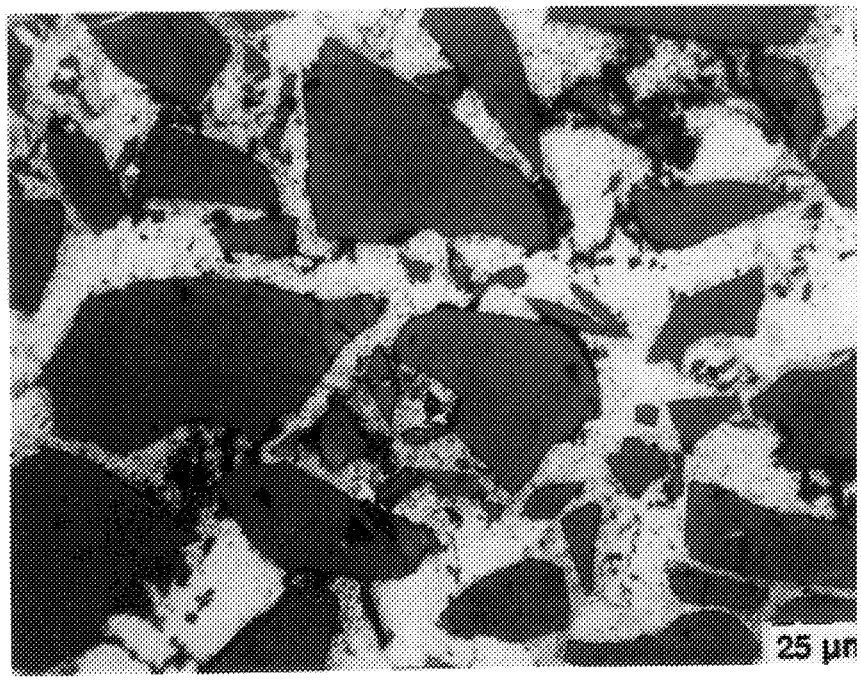

At about room temperature, the setup was disassembled and the treated sample was sectioned, mounted, and polished. Examination of the microstructure with an optical microscope revealed that intermetallics had formed in the matrix metal. Additional examination with an electron microscope using energy-dispersive x-ray analysis (EDAX) indicated that the intermetallic species comprised copper, magnesium, and alumina. Specifically, FIG. 4 is an secondary electron image of the microstructure taken at about 100× showing the alumina reinforcement 52, the copper containing intermetallics 53 and the matrix metal 54.

EXAMPLE 3

The following Example demonstrates a method for modifying the morphology of the precipitates which form in a matrix metal by ball milling the filler material mixture prior to forming the metal matrix composite body by a spontaneous infiltration technique. Specifically, this Example demonstrates that the incorporation of fine particles resulting from the breaking of small portions from the filler material mixture during the ball milling operation introduces nucleation sites within the matrix metal that modifies the size and/or morphology of the resultant precipitates in the matrix metal. Table I summarizes the filler material, the matrix metal, the ball milling time, the ultimate tensile strength (UTS), the elastic modulus, the coefficient of thermal expansion, (CTE) the fracture toughness, and the density of the metal matrix composite bodies formed in this Example, as described below.

Sample A

A filler material mixture was made by placing about 10,000 grams of BURUNDUM® alumina milling media (U.S. Stoneware, Mahwah, N.J.), measuring about 15/16 inch (24 mm) in diameter, into an 8.9 liter porcelain ball mill (U.S. Stoneware Corp.). About 5000 grams of 39 CRYSTOLON® 220 grit silicon carbide (Norton Company, Worcester, Mass.) were added to the mill and the mixture was dry ball milled for about 24 hours. The milling media was then removed and about 100 grams of −325 mesh magnesium powder (AESAR®, Johnson Matthey Company, Seabrook, N.H.) were added. The admixture of ball milled silicon carbide and magnesium particulate was then roll mixed for about 2 hours.

A graphite foil box measuring about 8 inches (203 mm) long by about 4 inches (102 mm) wide by about 5 inches (127 mm) high was made from a piece of GRAFOIL® graphite foil (Union Carbide Company, Danbury, Conn.) measuring about 14 inches (356 mm) long by about 12.5 inches (318 mm) wide by about 15 mils (0.38 mm) thick. Four parallel cuts, about 5 inches (127 mm) from the side and about 5 inches (127 mm) long, were made into the graphite foil. The cut graphite foil was then folded into a graphite foil box with edges glued together with RIGID-LOCK® graphite cement (Polycarbon Corporation, Valencia, Calif.). The bottom of the interior of the graphite foil box was uniformly coated with a mixture comprising by volume equal parts of RIGIDLOCK® graphite cement and PHARMCO™ ethyl alcohol (Pharmco Products, Inc., Bayonne, N.J.). The wet graphite cement layer on the bottom of the inside of the graphite foil box was then uniformly coated with a layer of −50 mesh magnesium particulate (ALFA® Products, Morton Thiokol Inc., Danvers, Mass.).

A quantity of the roll mixed filler admixture was poured into the graphite foil box to a depth of about 1 inch (25 mm). After leveling the filler material admixture, about 7 grams of AESAR® magnesium particulate (−50 mesh) was sprinkled evenly over the surface of the leveled filler material. A matrix metal ingot measuring about 4 inches (102 mm) wide by about 4½ inches (114 mm) long by about 1½ inches (38 mm) thick, weighing about 1200 grams and comprising by weight about 12 percent silicon, 2 percent magnesium and the balance aluminum, was placed into the graphite foil box and oriented such that one of the about 4½ by 1½ inch (114 by 38 mm) faces contacted the magnesium particulate layer in the box.

The graphite boat and its contents were then placed into a resistance heated controlled atmosphere furnace. The furnace chamber was evacuated to a vacuum of about 30 inches of mercury and then backfilled with nitrogen gas to establish a nitrogen gas flow rate of about 2.5 liters per minute. The furnace temperature was increased from about room temperature to about 750° C. at a rate of about 150° C. per hour. After maintaining a temperature of about 750° C. for about 15 hours, the temperature was decreased to about 675° C. at a rate of about 150° C. per hour. At a temperature of about 675° C., the graphite boat and its contents were removed from the furnace and placed onto a room temperature graphite chill plate to directionally solidify the formed metal matrix composite and the residual matrix metal reservoir. After the residual matrix metal had cooled to substantially room temperature, the graphite foil box and its contents were removed from the graphite boat and the graphite foil was peeled away to reveal that matrix metal had infiltrated the filler material admixture to form a metal matrix composite.

Samples B and C

Metal matrix composite Samples B and C were formed in substantially the same manner as was metal matrix composite Sample A, except that the 220 grit silicon carbide filler was ball milled for 12 hours in Sample B and for 6 hours in Sample C.

TABLE I

Effect of Ball Milling on MMC Properties

| Sample | Filler Material | Matrix Metal | Hours Ball Milled | UTS (MPa) | Strain to Failure (%) | Elastic Mod. (E) | CTE (°C.$^{-1}$ × $10^{-6}$) | Fracture Toughness (MPA-m$^{1/2}$) | Density (g/cm$^3$) |
|---|---|---|---|---|---|---|---|---|---|
| A | 220#SiC[1] | Al—12Si—2Mg | 24 | 228 | 0.212 | 188 | 12.8 | 12.19 | 2.17 |
| B | 220#SiC[1] | Al—12Si—2Mg | 12 | 209 | 0.219 | 170 | 12.1 | 11.86 | 2.81 |
| C | 220#SiC[1] | Al—12Si—2Mg | 6 | 209 | 0.211 | 172 | 12.8 | 11.15 | 2.80 |
| D | 220#SiC[1] | Al—12Si—2Mg | 0 | 145 | 0.133 | 164 | 12.2 | 10.31 | 2.81 |

[1] 39 CRYSTOLON® silicon carbide (Norton Company, Worcester, MA)

Sample D

Metal matrix composite Sample D was formed in substantially the same manner as metal matrix composite Samples A, B and C, except that the 220 grit silicon carbide filler material was not ball milled (the two hour roll mixing operation of the silicon carbide and magnesium particulates was retained).

The metal matrix composite bodies of this Example were cut, mounted, and polished to compare the microstructures of the resultant bodies. Specifically, FIGS. 5a, 5b, 5c, and 5d are photomicrographs taken at about 400× magnification which correspond to Samples A, B, C and D, respectively. These micrographs show that, as the ball milling time is increased, the amount of fine particles in the metal matrix body increases. The micrographs also show that as the amount of fine particles is increased, the quantity and morphology of precipitates in the metal matrix composite body is altered.

Properties of the metal matrix formed composite bodies in this Example are set forth in Table 1. Details of the test procedures for measuring the properties of the metal matrix composite bodies are set forth below.

Measurement of Ultimate Tensile Strength (U.T.S.)

The tensile strength of some metal matrix composites was determined using ASTM #B557-84 "Standard Methods of Tension Testing Wrought and Cast Aluminum and Magnesium Products". Rectangular tension test specimens having dimensions of 6 inches (154 mm) long by 0.5 inch (13 mm) wide and 0.1 inches (2.5 mm) thick were used. The gauge section of the rectangular tensile test specimens was about ⅜ inch (10 mm) wide by about 0.75 inches (19 mm) long and the radii from end section to the gauge section were about 3 inches (76 mm). Four aluminum gripping tabs, about 2 inches (51 mm) long by about 0.5 inch (13 mm) wide and about 0.3 inches (7.6 mm) thick, were fastened to the end sections of each rectangular tension test specimens with an epoxy (designated Epoxy-patch™, Dexter Corporation of High Sol Aerospace and Industrial Products, Seabrook, N.H.). The strain of the rectangular tension test specimens was measured with strain gauges (350 ohm bridges) designated CEA-06-375UW-350 from Micromeasurements of Raleigh, N.C. The rectangular tension test specimens, including the aluminum gripping tabs and strain gauges, were placed in wedge grips on a Syntec 5000 pound (2269 kg) load cell (Universal Testing Machine, Model No. CITS 2000/6 manufactured by System Integration Technology Inc. of Stoughton, Mass.). A computer data acquisition system was connected to the measuring unit, and the strain gauges recorded the test responses. The rectangular tension test specimens were deformed at a constant rate of 0.039 inches/minute (1 mm/minute) to failure. The ultimate tensile stress, maximum strain and strain to failure were calculated from the sample geometry and recorded responses with programs within the computer.

Measurement of Modulus by the Resonance Method

The elastic modulus of the metal matrix composites was determined by a sonic resonance technique which is substantially the same as ASTM method C848-88. Specifically, a composite sample measuring from about 1.8 to 2.2 inches long, about 0.24 inches wide and about 1.9 inches thick (about 45 mm to about 55 mm long, about 6 mm wide and about 4.8 mm thick) was placed between two transducers isolated from room vibrations by an air table supporting a granite stone. One of the transducers was used to excite frequencies within the composite sample while the other was used to monitor the frequency response of the metal matrix composite. By scanning through frequencies, monitoring and recording the response levels for each frequency, and noting the resonant frequency the elastic modulus was determined.

Measurement of the Fracture Toughness for Metal Matrix Material Using a Chevron Notch Specimen The method of Munz, Shannon and Bubsey, was used to determine the fracture toughness of metal matrix materials. The fracture toughness was calculated from the maximum load of Chevron notch specimen in four point loading. Specifically, the geometry of the Chevron notch specimen was about 1.8 to 2.2 inches (45 to 55 mm) long, about 0.19 inches (4.8 mm) wide and about 0.24 inches (6 mm) high. A Chevron notch was cut with a diamond saw to propagate a crack through the sample. The Chevron notched samples, the apex of the Chevron pointing down, were placed into a fixture within a Universal test machine. The notch of the Chevron notch sample, was placed between two pins 1.6 inches (40 mm) apart and approximately 0.79 inch (20 mm) from each pin. The top side of the Chevron notch sample was contacted by two pins 0.79 inch (20 mm) apart and approximately 0.39 inch (10 mm) from the notch. The maximum load measurements were made with a Sintec Model CITS-2000/6 Universal Testing Machine manufactured by System Integration Technology Incorporated of Stoughton, Mass. A cross-head speed of 0.02 inches/minute (0.58 millimeters/minute) was used. The load cell of the Universal testing machine was interfaced to a computer data acquisition system. Chevron notch sample geometry and maximum load were used to calculate the fracture toughness of the material. Several samples were used to determine an average fracture toughness for a given material.

EXAMPLE 4

This Example demonstrates that the filler reinforcement loading in a metal matrix composite can be reduced, while simultaneously modifying the composition of the matrix metal of the composite, by adding to the filler material or preform a powdered metal or metal alloy having a composition different from the matrix metal.

A graphite foil box measuring about 3¼ inches long by about 1¾ inches wide by about 4½ inches high was fabricated from a single sheet of GRAFOIL® graphite foil (Union Carbide Company, Danbury, Conn.), measuring about 0.015 inch thick, by making strategically placed cuts and folds in the sheet. The folded portions of the GRAFOIL® box were cemented together with RIGID-LOCK® graphite cement (Polycarbon Corporation, Valencia, Calif.), and the cemented portions were further reinforced by stapling the box. The formed GRAFOIL® box was then placed into a graphite boat having a wall thickness of about ½ inch and measuring about 9 inches by about 5 inches by about 4 inches high.

About 200 grams of a filler material admixture comprising by weight about 20 percent copper particulate, about 1.6% –325 mesh magnesium particulate (Reade Manufacturing Company, Lakehurst, N.J.) and the balance Grade T-64 –325 mesh tabular alumina (Alcoa Industrial Chemicals Division, Bauxite, Ark.) were placed into a dry, approximately 1.1 liter porcelain ball mill (U.S. Stoneware Corporation, Mahwah, N.J.) containing about 400 grams of approximately ½ inch diameter BURUNDUM® ball milling media (U.S. Stoneware, Mahwah, N.J.). The ball mill lid was secured, and the filler material admixture was ball milled for about 2 hours. After ball milling, about 99 grams of the filler material admixture was poured into the GRAFOIL® box and leveled. About ½ gram of –100 mesh magnesium particulate (Hart Corporation, Tamaqua, Pa.) was sprinkled evenly over the surface of the filler material admixture. An approximately 446 gram ingot of matrix metal measuring about 1⅝ inches square and about 4 inches high and comprising commercially pure aluminum (Aluminum Association 170.1), was sandblasted to remove any surface oxide present thereon. The ingot was then cleaned with ethyl alcohol to remove any debris from the sandblasting operation and placed onto the layer of magnesium particulate in the GRAFOIL® box.

The graphite boat and its contents were placed into a retort within a controlled atmosphere furnace at substantially room temperature. The retort was sealed, evacuated to a vacuum about 30 inches of mercury and then backfilled with nitrogen gas to establish a nitrogen gas flow rate of about 5 liters per minute. The temperature in the furnace was then increased to about 800° C. at a rate of about 200° C. per hour, maintained at about 800° C. for about 15 hours, then decreased to about 760° C. at a rate of about 200° C. per hour. At a temperature of about 760° C., the graphite boat and its contents were removed from the retort and placed onto a water cooled aluminum quench plate. FEEDOL® No. 9 hot topping particulate mixture was then poured over the residual molten matrix metal. After the exothermic reaction from the hot topping mix had substantially subsided, the top and sides of the graphite boat were covered with an approximately 2 inch thick layer of CERABLANKET® ceramic fiber blanket material (Manville Refractory Products, Denver, Colo.). At about room temperature, the lay-up was removed from the graphite boat and the GRAFOIL® box was disassembled to reveal that matrix metal had infiltrated the filler material admixture to form a metal matrix composite body.

Quantitative image analysis of the formed metal matrix composite body was carried out using a Nikon microphoto-FX optical microscope with a DAGE-MTI series 68 video camera (DAGE-MTI Inc., Michigan City, Ind.) attached to the top port. The video camera signal was sent to a Model DV-4400 scientific optical analysis system (Lamont Scientific State College, Pa.). Results of the quantative image analysis revealed that the volume fraction of the tabular alumina constituent of the filler material was approximately 47 volume percent.

Semi-quantitative analysis was performed on the matrix metal phase of the metal matrix composite body to determine the constituents present within the matrix metal. Analysis was carried out using the energy dispersive X-ray analysis (EDAX) feature (Model VZ15, Princeton Gama Tech, Inc., Princeton, N.J.) on a scanning electron microscope (Model 500, Philips MV land Oven, The Netherlands) coupled to a spectrum analyzer (Tracor Northern Inc., Middleton, Wis.). The elemental composition analysis of six discrete spots in the matrix metal indicated that copper was present in the matrix metal of the formed metal matrix composite body.

EXAMPLE 5

A metal matrix composite body was formed in a manner substantially identical to that described for the metal matrix composite of Example 2.

The formed metal matrix composite body was modified by heating within a bed of alumina and boron oxide. Specifically, the formed metal matrix composite body was cut with a diamond saw to form a composite sample weighing about 87 grams, and the composite sample was placed into an alumina boat. The composite sample was then surrounded with approximately 144 grams of a material comprising, by weight, about 50% boron oxide (Fisher Scientific, Pittsburgh, Pa.) and about 50% alumina. A layer of boron oxide, weighing about 96 grams, was then placed on top of the alumina-boron oxide material surrounding the composite body.

The alumina boat and its contents were placed into an air atmosphere box furnace at room temperature. The temperature of the furnace was increased to about 850° C. at a rate of about 300° C. per hour, held at about 850° C. for about 150 hours, then decreased to room temperature at a rate of about 300° C. per hour.

Figure 6:
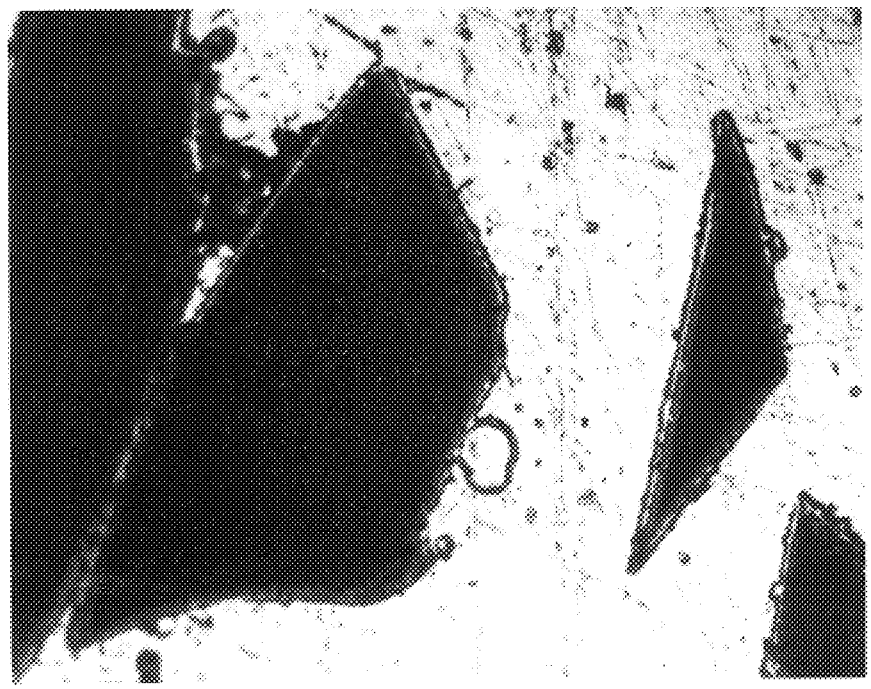
FIG. 6 is a photomicrograph at about 400× magnification of the metal matrix composite body as modified in Example 5.

The alumina boat and its contents were removed from the furnace, and the composite sample was sectioned, mounted, and polished for examination under an optical microscope. It was noted that a reaction layer 71 had formed around the perimeter of the alumina grains 72, as shown in FIG. 6.

EXAMPLE 6

This Example demonstrates the spontaneous infiltration of a molten matrix metal into a preform containing as an additive a second material which may modify at least one property of a metal matrix composite body. A schematic view of the lay-up employed in carrying out the spontaneous infiltration process of the present Example is shown in cross-section in FIG. 7.

A series of preforms containing a filler material and various percentages of second materials were fabricated as follows. First, a dry pressable powder mixture was prepared. Specifically, about 5% by weight of CERACER® 642 free-flowing PT wax binder (Shamrock, Newark, N.J.) was added to a permeable mass comprising the filler material, an optional second material and about 3% by weight AESAR® magnesium particulate (−325 mesh, Aesar Group of Johnson Matthey Co., Seabrook, N.H.) having substantially all particles smaller than about 45 microns in diameter. The second material was either 320 grit TETRABOR® boron carbide particulate (average particle diameter of about 32 microns, ESK Engineered Materials, New Canaan, Conn.) or Grade LC12N silicon nitride particulate (Hermann C. Starck, Inc., New York, N.Y.) having an average particle size of about 1–2 microns. The filler material was a 70:30 weight ratio of 220 and 500 grit 39 CRYSTOLON® silicon carbide particulates (average particle diameters of about 66 and 17 microns, respectively, Norton Co., Worcester, Mass.). This mixture was then placed into a plastic jar. A mass of ceramic beads having a total weight of about 50% of the weight of the mixture and each measuring about 1/8 inch (3 mm) to 3/16 inch (5 mm) in diameter was then added to the jar to help disperse the constituents of the mixture. The jar was then sealed and placed on a rotating mill rack for about 16 hours to roll mix the contents of the jar. The roll-mixed powder was then passed through a 25 mesh screen (opening size of about 710 microns) to separate the ceramic beads from the powder. A quantity of powder was then placed into a pressing die and a cylindrical preform measuring about 1 inch (25 mm) in diameter by about 0.5 inch (13 mm) thick was uniaxially dry pressed under a maximum applied pressure of about 3.9 Ksi (27 MPa).

The amount of second material in each permeable mass was as follows. The Sample F permeable mass contained about 5% by weight of the above-described boron carbide particulate. The Sample G permeable mass contained about 10% by weight boron carbide particulate. The Sample H permeable mass contained about 25% by weight boron carbide particulate. The Sample I permeable mass contained about 50% by weight boron carbide particulate. The Sample K permeable mass contained about 5% by weight of the above-described silicon nitride particulate. The Sample L permeable mass contained about 10% by weight silicon nitride particulate. The Sample M permeable mass contained about 25% by weight silicon nitride particulate, and the Sample N permeable mass contained about 50% by weight silicon nitride particulate. The Sample E and Sample J permeable masses did not contain any boron carbide or silicon nitride particulates.

Figure 7:
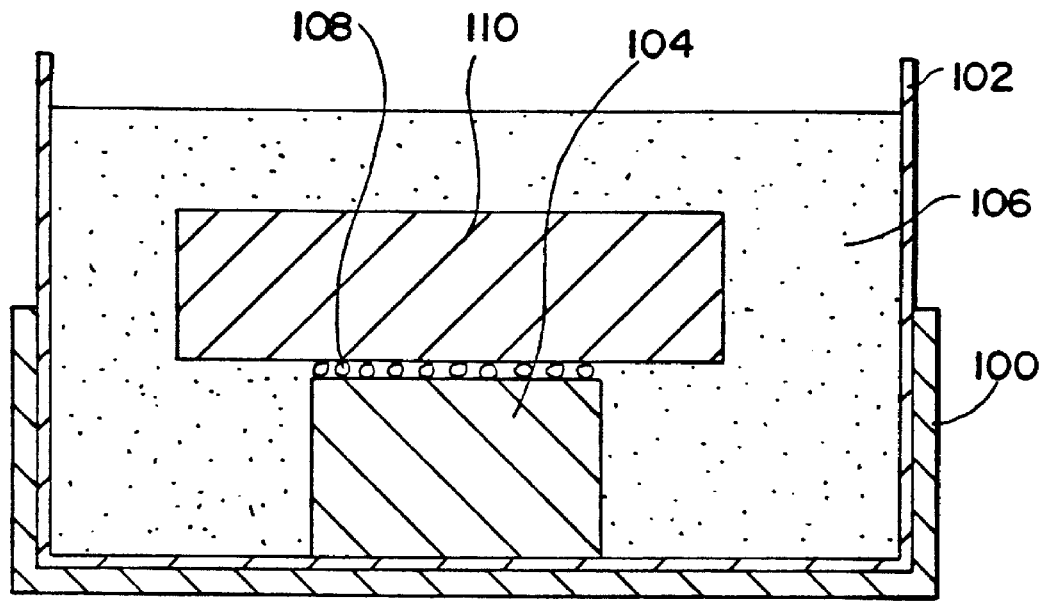
FIG. 7 is a cross-sectional schematic view of the lay-up employed in fabricating the metal matrix composite bodies described in Example 6.

Lay-ups for each of the preforms fabricated from Sample E–N materials were then assembled as follows. Referring to FIG. 7, an alumina sagger tray 100 measuring about 4 inches (102 mm) long by about 2 inches (51 mm) wide by about 0.5 inch (13 mm) high was lined in its interior with a single sheet of GRAFOIL® graphite foil (Union Carbide Co., Carbon Products Division, Cleveland, Ohio) having a thickness of about 15 mils (0.38 mm) by making strategically placed cuts and folds in the graphite foil and cementing the folds to one another using RIGIDLOCK® graphite cement (Polycarbon Corp., Valencia, Calif.). The formed graphite foil box 102 had substantially the same length and width dimensions as the interior of the alumina center tray 100, but had a height of about 1.5 inches (37 mm). Each preform 104 was placed in the center of the base of each formed graphite foil box 102. A bedding or barrier material 106 comprising by weight about 9% borosilicate glass frit (Grade F-69, Fusion Ceramics, Inc., Carrollton, Ohio) and the balance 90 grit 38 ALUNDUM® alumina particulate (Norton Co., Worcester, Mass.) having an average particle size of about 216 microns was poured into the graphite foil box 102 around the preform 104 to a level substantially flush with the top surface of the preform 104. The top of the preform 104 was swept clean of any of this bedding material admixture 106 and about 0.14 grams of magnesium particulate 108 (−50 mesh, atomized, Hart Corporation, Tamaqua, Pa.) having substantially all particles smaller than about 300 microns in diameter was sprinkled evenly over the top surface of the preform 104. An ingot of a matrix metal 110 comprising by weight about 15% silicon, about 0.5% magnesium and the balance aluminum and weighing about 44 grams and measuring about 2 inches (51 mm) long by about 1 inch (25 mm) wide by about 0.5 inch (13 mm) high was placed squarely on top of the layer of magnesium particulate 108. Additional alumina/glass frit particulate bedding material 106 was the poured into the graphite foil box 102 around and over the ingot of matrix metal 110 substantially completely burying the preform 104, the magnesium particulate 108 and the ingot of matrix metal 110, thus completing the lay-up.

Each lay-up comprising the alumina center tray 100 and its contents was then placed into a controlled atmosphere furnace at about room temperature. The furnace chamber was evacuated to a vacuum of about 30 inches (762 mm) of mercury and then backfilled with commercially pure nitrogen gas to substantially atmospheric pressure. A nitrogen gas flow rate of about 500 standard cubic centimeters per minute (sccm) was thereafter established and maintained. The furnace temperature was then increased from about 20° C. to a temperature of about 400° C. at a rate of about 200° C. per hour. After maintaining a temperature of about 400° C. for about 2 hours, the furnace temperature was then further increased to a temperature of about 800° C. at a rate of about 200° C. per hour. After maintaining a temperature of about 800° C. for about 20 hours, power to the heating elements of the furnace was interrupted and the furnace and its contents were allowed to cool at the furnace cooling rate back to about 20° C. After cooling to about 20° C., the lay-up was removed from the controlled atmosphere furnace. The alumina/glass frit particulate bedding material was removed with light hammer blows to reveal that the matrix metal had at least partially infiltrated the dry pressed preform to produce a metal matrix composite body.

Each of the formed metal matrix composite bodies was then sectioned with a diamond saw and polished with diamond paste to allow hardness indentation measurements and metallographic examinations to be made.

Figure 8:
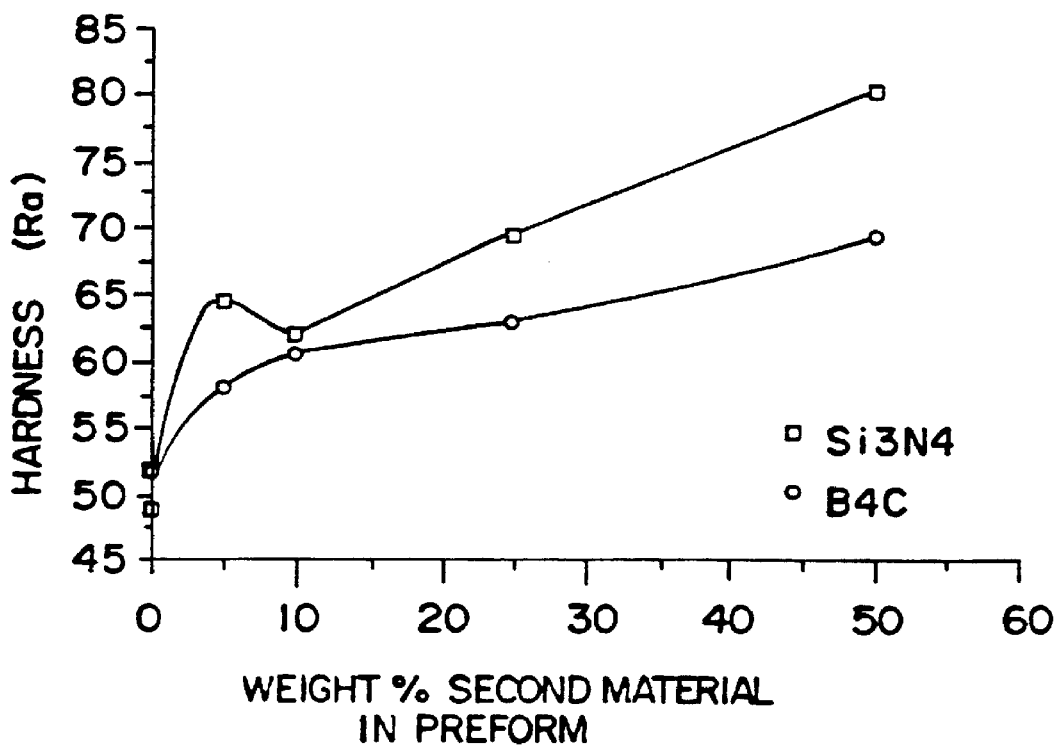
FIG. 8 is a graph showing the hardness of a metal matrix composite body as a function of the percentage of a second material in the preform.

FIG. 8 is a graph showing the resulting Rockwell A hardness of each of the sectioned and polished composite bodies as a function of the type and amount of material added to the preform which was spontaneously infiltrated by the molten matrix metal in the metal matrix composite formation process. Table II shows the specific values for each of the data points of FIG. 8. The data clearly show a strong increase in hardness as a function of the concentration of the second material in the preform, with silicon nitride having a more positive response than boron carbide.

TABLE II

EFFECT OF PREFORM ADDITIVE (SECOND MATERIAL) ON HARDNESS OF FORMED MMC

| Sample | Second Material | Hardness ($R_A$) |
|---|---|---|
| E | 0 | 51.5 ± 1.8 |
| F | 5 wt % $B_4C$ | 58.0 ± 3.4 |
| G | 10 wt % $B_4C$ | 60.5 ± 3.6 |
| H | 25 wt % $B_4C$ | 62.9 ± 3.0 |
| I | 50 wt % $B_4C$ | 69.4 ± 2.0 |
| J | 0 | 48.8 ± 4.0 |
| K | 5 wt % $Si_3N_4$ | 64.5 ± 3.1 |
| L | 10 wt % $Si_3N_4$ | 62.1 ± 6.1 |
| M | 25 wt % $Si_3N_4$ | 69.5 ± 3.9 |
| N | 50 wt % $Si_3N_4$ | 80.3 ± 2.5 |

Thus, this Example demonstrates that preforms comprising fillers and second materials may be spontaneously infiltrated with molten matrix metals to form metal matrix composite bodies. Furthermore, this Example demonstrates that the addition of such second materials may affect at least one property of the formed metal matrix composite body. Specifically, this Example demonstrates that the hardness of a metal matrix composite body may be increased by adding boron carbide or silicon nitride particulate to a silicon carbide particulate preform prior to spontaneously infiltrating a molten matrix metal into the preform.

EXAMPLE 7

Figure 9:
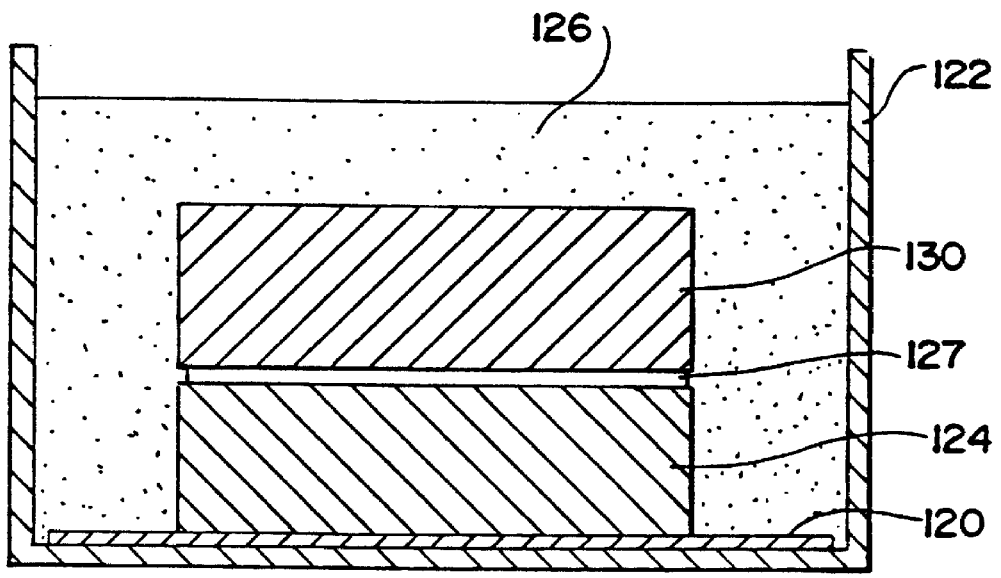
FIG. 9 is a cross-sectional schematic view of the lay-up employed in fabricating the metal matrix composite bodies of Example 7.

This Example demonstrates the effect of infiltration temperature on the hardness of a metal matrix composite body formed by spontaneously infiltrating a molten aluminum alloy matrix metal into a permeable mass comprising silicon nitride. FIG. 9 is a cross-sectional schematic view of the lay-up employed in fabricating the metal matrix composite bodies of the present Example.

Sample O

A particulate mixture for dry pressing was fabricated as follows. About 2.3% by weight polyvinyl alcohol, about 1.2% by weight PEG 400 polyethylene glycol (Union Carbide Co., Danbury, Conn.), about 7.8% by weight NYACOL® 2040 colloidal silica suspension (Nyacol Products, Inc., an affiliate of PQ Corporation, Ashland, Mass.) and the balance utility grade silicon nitride particulate (−325 mesh, Elkem Materials, Inc., Pittsburgh, Pa.) having substantially all particles smaller than about 45 microns in diameter was blended in a high speed, high intensity mixer (Eirich Machines, Inc., Uniontown, Pa.) until the mixture was substantially completely homogeneously mixed. The total moisture content of the mix was about 12.9% by weight. The mixed powder was then allowed to dry in air at about room temperature for about 16 hours. The dried powder was then passed through a 25 mesh screen (screen opening size of about 710 microns) and uniaxially dry pressed at a maximum applied pressure of about 20 ksi (140 MPa). The dry pressed preform measured about 2 inches (51 mm) square by about 0.5 inch (13 mm) thick.

The dry pressed Sample O preform was then fired in an air atmosphere according to the following procedure. The dry pressed preform was placed onto a cordierite support plate measuring about 13 inches (330 mm) by about 9 inches (229 mm) by about 1 inch (25 mm). The support plate featured through-holes each measuring about 1 inch (25 mm) in diameter and regularly spaced about 1 inch apart. The support plate and the preform were then placed into an air atmosphere furnace. The temperature inside the furnace was then linearly increased from about 20° C. to a temperature of about 500° C. over a period of about 5 hours. After maintaining a temperature of about 500° C. for about 5 hours, the temperature was then further linearly increased to a temperature of about 850° C. over a period of about 3 hours. After maintaining a temperature of about 850° C. for about 4 hours, the furnace and the fired preform contained therein were allowed to cool back to about 20° C. at the natural furnace cooling rate.

Referring to FIG. 9, a lay-up was prepared as follows. A sheet of GRAFOIL® graphite foil 120 (Union Carbide Co., Carbon Products Division, Cleveland, Ohio) having substantially the same length and width dimensions as those of the interior of a Grade ATJ graphite boat 122 (Union Carbide Co.) having interior dimensions of about 9 inches (229 mm) in length by about 4 inches (102 mm) in width and having a height of about 2 inches (51 mm). The pressed and fired preform 124 was then placed on top of the sheet of graphite foil 120. A bedding or barrier material 126 comprising a particulate mixture comprising about 5% by weight Grade F-69 glass frit (Fusion Ceramics, Inc., Carrollton, Ohio) and the balance 90 grit 38 ALUNDUM® alumina particulate (Norton Co., Worcester, Mass.) having an average particle size of about 216 microns was poured into the graphite boat 122 on top of the graphite foil sheet 120 around the pressed and fired preform 124 to a level substantially flush the top surface of the preform 124. A slurry comprising approximately equal weight measures of nickel particulate (-325 mesh, substantially all particle diameters smaller than about 45 microns) and ethyl alcohol was painted over the exposed top surface of the preform. The ethyl alcohol was allowed to evaporate leaving a thin coating of nickel particulate 127 on the top surface of the preform 124. An ingot of a matrix metal 130 comprising by weight about 5% magnesium and the balance aluminum, weighing about 113 grams and measuring about 2 inches (51 mm) square by about 0.5 inch (13 mm) thick was placed squarely on top of the nickel coated preform 124. Additional alumina/glass frit particulate bedding material 126 was then poured into the graphite boat 122 around the nickel coated preform 124 and the ingot of matrix metal 130 substantially completely burying both to complete the lay-up for Sample O.

The Sample O lay-up comprising the graphite boat 122 and its contents were then placed into a resistance heated controlled atmosphere furnace. The furnace chamber was evacuated to a vacuum of about 30 inches (762 mm) of mercury and then backfilled with commercially pure nitrogen gas to substantially atmospheric pressure. A nitrogen gas flow rate through the furnace chamber of about 5 standard liters per minute (slm) was thereafter established and maintained. The furnace temperature was then increased from about 20° C. to a temperature of about 800° C. at a rate of about 200° C. per hour. After maintaining a temperature of about 800° C. for about 20 hours, the furnace temperature was then decreased to a temperature of about 700° C. at a rate of about 200° C. per hour. At a temperature of about 700° C., the graphite boat and its contents were removed from the furnace and placed onto a graphite chill plate maintained at a temperature of about 20° C. to directionally solidify the molten matrix metal. After the lay-up had cooled to about 20° C., the lay-up was disassembled to reveal that the matrix metal had infiltrated the preform comprising the silicon nitride particulate to form a metal matrix composite body.

Samples P and Q

Metal matrix composite Samples P and Q were formed in substantially the same manner as was metal matrix composite Sample O, except that the spontaneous infiltration of molten matrix metal into the preform comprising the silicon nitride particulate was carried out at temperatures of about 900° C. and about 1000° C., respectively instead of 800° C.

The formed metal matrix composite bodies were sectioned using a diamond saw and hardness tested. Table III shows the resulting Rockwell A hardness for each of Samples O, P and Q as a function of the temperature at which spontaneous infiltration was conducted. The data clearly show that increases in the temperature at which infiltration of the molten aluminum alloy matrix metal is conducted results in increases in hardness of the formed metal matrix composite bodies.

TABLE III

EFFECT OF INFILTRATION TEMPERATURE ON HARDNESS OF FORMED MMC

| Sample | Infiltration Temp. (C.°) | Hardness ($R_A$) |
| --- | --- | --- |
| O | 800 | 73.0 ± 1.2 |
| P | 900 | 79.7 ± 1.1 |
| Q | 1000 | 84.5 ± 1.2 |

Thus, this Example demonstrates that preforms comprising silicon nitride particulate may be spontaneously infiltrated by a molten matrix metal to form a metal matrix composite body. Furthermore, this Example demonstrates that the hardness of the resulting metal matrix composite body is a function of the spontaneous infiltration temperature. Specifically, for the above-described system, higher infiltration temperatures produce harder metal matrix composite bodies.

EXAMPLE 8

Figure 10:
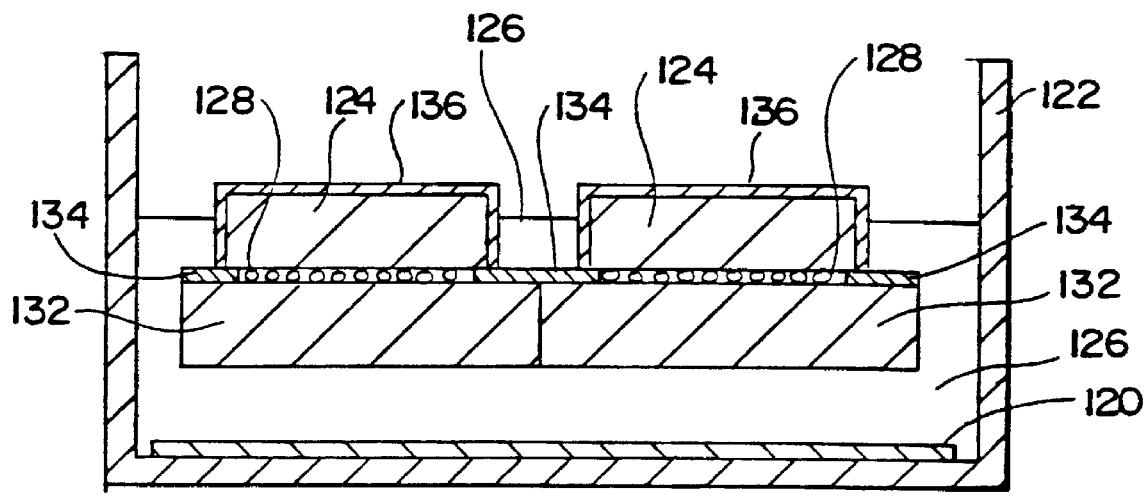
FIG. 10 is a cross-sectional schematic view of the lay-up employed in fabricating the metal matrix composite bodies of Example 8.

This Example demonstrates that the properties and the composition of a metal matrix composite body may be modified by a post-formation treatment process which is subsequent to the spontaneous infiltration process employed in fabricating the metal matrix composite body. FIG. 10 is a cross-sectional schematic view of the lay-up employed in fabricating the metal matrix composite body of the present Example.

Two preforms 124 were fabricated in substantially the same manner as was described in Example 7 with the exception that each preform measured about 4 inches (102 mm) square by about 0.4 inch (10 mm) thick.

The preforms 124 were then coated with a barrier material comprising colloidal graphite 136 as follows. A thin layer of DAG® 154 colloidal graphite (Acheson Colloids, Port Huron, Mich.) was then applied by means of a foam paintbrush on five sides of each preform, leaving one of the 4 inch (102 mm) square faces uncoated. After a short period of time during which substantially all of the volatiles in the product evaporated, a second such layer of colloidal graphite 136 was applied. The coating procedure was performed a third time. The preforms 124 coated with this colloidal graphite 136 mixture were then allowed to dry.

A lay-up was then fabricated as follows. A GRAFOIL® graphite foil sheet 120 (Union Carbide Co., Carbon Products Division, Cleveland, Ohio) having a thickness of about 15 mils (0.38 mm) and having substantially the same length and width dimensions as the interior of a Grade ATJ graphite boat 122 (Union Carbide Co.) measuring in its interior about 12 inches (305 mm) long by about 9 inches (229 mm) wide by about 4 inches (102 mm) in height was placed on the floor of the graphite boat 122. A bedding or barrier material 126 comprising by weight about 10% Grade F-69 glass frit (Fusion Ceramics, Inc., Carrollton, Ohio) and the balance 90 grit 38 ALUNDUM® alumina particulate (average particle size of about 216 microns, Norton Co., Worcester, Mass.) was poured into the graphite boat 122 on top of the graphite sheet 120 to a depth of about 1 inch (25 mm) and leveled. Two ingots of a matrix metal 132 comprising by weight about 15% silicon, 5% magnesium, 10% copper and the balance aluminum were placed adjacent to one another and on top of the leveled alumina/glass frit particulate bedding admixture 126 to form, during subsequent processing at elevated temperature, one large pool of molten matrix metal having dimensions of about 10 inches (254 mm) in length by about 7 inches (178 mm) in width by about 0.5 inch (13 mm) thick. A GRAFOIL® graphite foil sheet 134 (Union Carbide Co.) having a thickness of about 15 mils (0.38 mm) and length and width dimensions substantially matching those of the assembled ingots of matrix metal 132 was placed squarely on top of the assembled ingots of matrix metal 132. The graphite foil sheet 134 featured two square openings each having length and width dimensions approximately 0.375 inch (10 mm) shorter than each of the length and width dimensions of the two preforms 124. About 2.25 grams of magnesium particulate 128 (–50 mesh, atomized, Hart Corp., Tamaqua, Pa.) having substantially all particles smaller than about 300 microns in diameter was sprinkled evenly over the exposed surface of the assembled matrix metal ingots 132 defined by the openings in the graphite foil sheet 134. The preforms 124 were then placed squarely over the magnesium particulate layer 128 and aligned with the square openings in the graphite foil window 134. Additional alumina/glass frit particulate bedding material 126 was then poured into the graphite boat 122 around the assembled ingots of matrix metal 132 to a level about ⅛ to ¼ inch (3 to 6 mm) above the bottom surface of the preforms 124 to complete the lay-up.

The lay-up comprising the graphite boat 122 and its contents was then placed into a controlled atmosphere furnace at about 20° C. The furnace was closed and the furnace chamber was evacuated to a vacuum of about 30 inches (762 mm) of mercury and then backfilled with commercially pure nitrogen gas to about atmospheric pressure. A nitrogen gas flow rate of about 5 slm through the furnace chamber was thereafter established and maintained. The furnace temperature was then increased from about 20° C. to a temperature of about 250° C. at a rate of about 200° C. per hour. After maintaining a temperature of about 250° C. for about 26.5 hours, the temperature was then increased to a temperature of about 950° C. at a rate of about 200° C. per hour. After maintaining a temperature of about 950° C. for about 30 hours, the temperature was then decreased to a temperature of about 700° C. at a rate of about 200° C. per hour. At a temperature of about 200° C., the furnace chamber was opened and the lay-up was removed. The preform was removed from the pool of molten matrix metal and residual adhered matrix metal was scraped off of the bottom surface of the now infiltrated preform. The infiltrated preform was then allowed to cool in air at ambient temperature to about 20° C.

After the infiltrated preform had cooled to about 20° C., the colloidal graphite coating 136 was removed by grit blasting to reveal that the matrix metal had substantially completely infiltrated the silicon nitride preform to form a metal matrix composite body. A portion of the formed metal matrix composite body was removed by means of a diamond saw and characterized in terms of its hardness and chemical composition. Specifically, the sectioned sample was hardness tested on the Rockwell A scale and chemically analyzed using qualitative x-ray diffraction analysis.

For the qualitative x-ray diffraction analysis, a portion of the sectioned sample was ground to a fine powder in a mortar and pestle and placed into the sample chamber of a Model D500 x-ray diffractometer (Siemens AG, Munich, Germany). The sample was then scanned with unfiltered with $CU_{K-alpha}$ x-radiation at an energy of about 40 KeV. The counting time was about 2 seconds at each 0.03° interval of 2-theta.

Figure 11A:
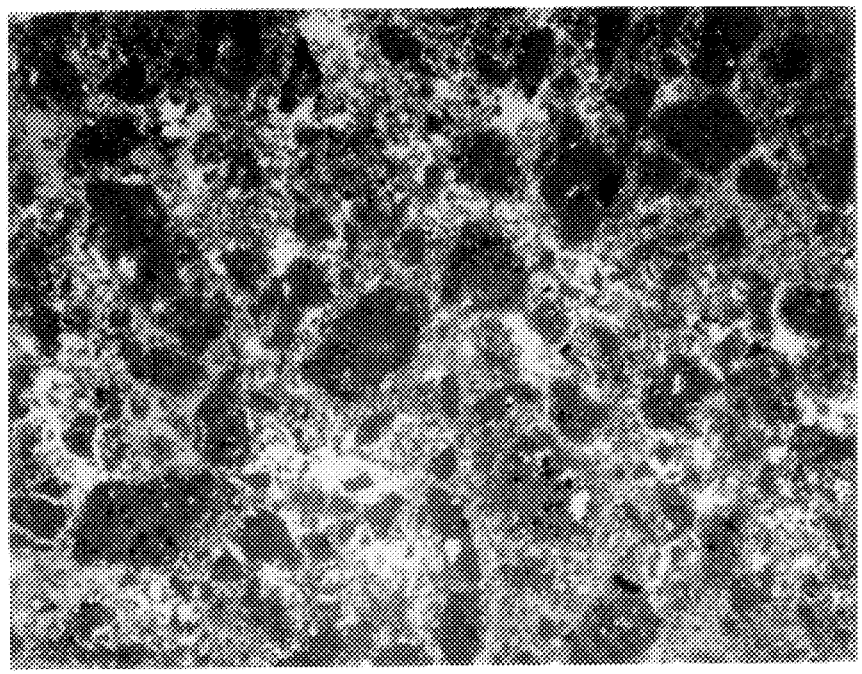
FIGS. 11a and 11b are optical photomicrographs at about 400× magnification of the samples, respectively, of the metal matrix composite body Example 8 as-infiltrated and post-process-treated, respectively.
Figure 11B:
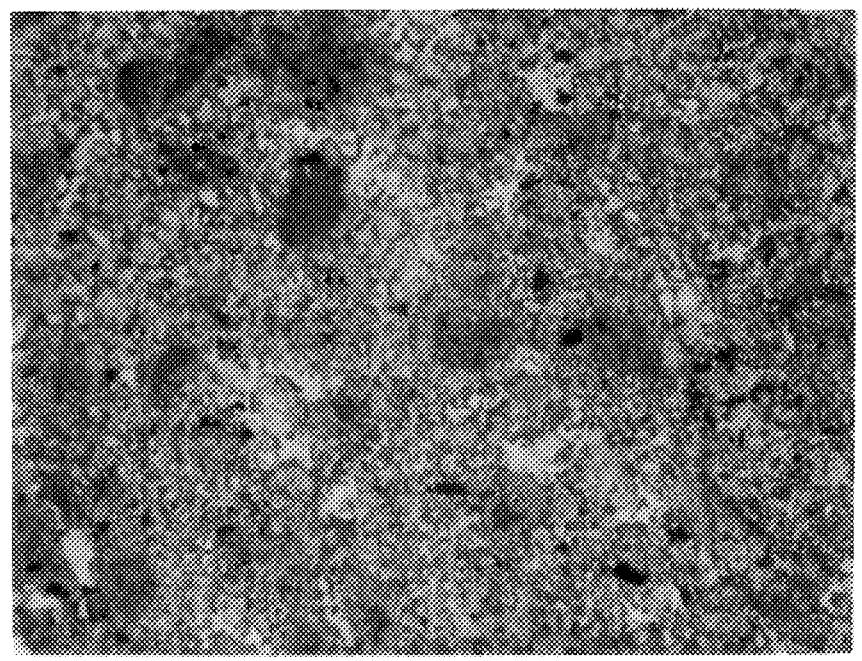

The remainder of the formed metal matrix composite was then given a post-formation process treatment specifically comprising an elevated temperature heat treatment. A boat made out of a castable refractory was filled to a depth of about 1 inch (25 mm) with wollastonite powder (–325 mesh, Nyco Corp., Willsboro, N.Y.) having substantially all particle diameters smaller than about 45 microns. Each formed metal matrix composite body was then placed into the refractory boat on top of the layer of wollastonite powder such that the metal matrix composite body contacted the wollastonite powder. Additional wollastonite powder (–325 mesh) was then poured into the refractory boat substantially completely burying the metal matrix composite bodies to a depth of about 1 inch (25 mm). The refractory boat and its contents was then placed into an air atmosphere furnace at about 20° C. The furnace and its contents were then heated from about 20° C. to a temperature of about 1200° C. at a rate of about 50° C. per hour. After maintaining a temperature of about 1200° C. for about 24 hours, the furnace temperature was then decreased to about 20° C. at a rate of about 100° C. per hour. After the furnace had cooled substantially to about 20° C., the refractory boat and its contents was removed from the furnace and each metal matrix composite body was recovered from the refractory boat. This heat treated metal matrix composite body was then hardness tested and found to be 3 Rockwell A hardness points harder than the non-heat treated portion of the metal matrix composite body, which had a hardness of $84^{RA}$. The heat treated metal matrix composite body was then chemically analyzed via qualitative x-ray diffraction analysis and compared to the non-heat treated body. The results are shown in Table IV. The data, the relative x-ray intensities, clearly show that the heat treatment process resulted in a decrease in the amount of silicon nitride and aluminum and an increase in the amount of aluminum nitride present in the body. These x-ray data suggest that the heat treatment process may permit the aluminum matrix metal and the silicon nitride reinforcement to react to form aluminum nitride above and beyond the amount of aluminum nitride which formed as a result of the initial infiltration of molten aluminum matrix metal into the silicon nitride preform. FIGS. 11a and 11b are optical photomicrographs taken at about 400× magnification of the polished cross-sections of these as-formed and heat-treated metal matrix composite bodies.

This Example therefore demonstrates that a preform comprising silicon nitride particulate may be spontaneously infiltrated by a molten aluminum matrix metal to form a metal matrix composite body and thereafter heat treated to modify the composition and at least one property of the metal matrix composite body.

EXAMPLE 9

This Example demonstrates the fabrication of a number of metal matrix composite bodies by the spontaneous infiltration of a variety of aluminum matrix metal alloys into permeable masses comprising several combinations of silicon carbide and/or silicon nitride. This Example furthermore demonstrates a post-formation process treatment (e.g., a heat treatment) given to the formed metal matrix composite bodies. The lay-up employed in fabricating the metal matrix composite bodies is illustrated in a cross-sectional schematic view in FIG. 12.

Permeable preforms representing Samples R–Y were fabricated by uniaxial dry pressing. A dry pressable powder blend was fabricated as follows. About 3000 grams of the silicon carbide and/or silicon nitride particulate was placed into the mixing chamber of a high speed, high

TABLE IV

EFFECT OF HEAT TREATMENT ON COMPOSITION OF FORMED MMC

| Composition (as suggested by relative x-ray intensities): | As Infiltrated | After Heat Treatment |
|---|---|---|
| $\alpha$-$Si_3N_4$ | 30 | 10 |
| $\beta$-$Si_3N_4$ | 25 | 10 |
| AlN | 35 | 70 |
| Al | 20 | 0 |
| Si | 100 | 100 | intensity, high shear mixer (Eirich Machines, Inc., Uniontown, PA). About 585 grams of a binder solution was divided into three approximately equal quantities. The first fraction was added to the mixing chamber and mixing was commenced. After mixing for about 1 minute, the mixer was turned off, the chamber was opened and that mixture which was adhered to the mixing chamber walls and the blades was scraped off with a spatula and deposited back into the mixing chamber. This procedure was repeated for the second and final remaining binder fractions. Mixing was then continued until the binder appeared to be uniformly dispersed into the powder and the mixture was appropriately granulated for subsequent dry pressing. The granulated powder was then poured out onto a sheet of paper and allowed to dry in air at about room temperature for about 16 hours. The dried powder was then screened through an approximately 25 mesh screen (screen openings of about 710 microns). The dried and screened powder was then loaded into a pressing die to a particular volume and, after a de-airing procedure consisting essentially of twice gently loading and unloading the powder, the powder was uniaxially pressed in a floating die arrangement under an applied pressure of about 20 ksi (140 MPa). The resulting preforms which were recovered from the die had dimensions of about 4 inches (102 mm) square by about 1.20 inches (30.5 mm) to about 1.24 inches (31.5 mm) thick.

Samples R and S

The particulate material making up the Sample R and Sample S permeable masses comprised utility grade silicon nitride particulate (Elkem Materials, Inc., Pittsburgh, PA) having substantially all particles smaller than about 45 microns in diameter. Moreover, the binder solution employed in preparing a dry pressable mixture comprised by weight about 40% of a polyvinyl alcohol stock solution, about 6% polyethylene glycol (400 molecular weight), about 40% NYACOL® 2040 colloidal silica suspension (Nyacol Products, Inc., an affiliate of PQ Corp., Ashland, Mass.) and about 14% water. The polyvinyl alcohol stock solution comprised by weight about 30% polyvinyl alcohol dissolved in water. A total of about 585 grams of the above-described binder components were mixed in a plastic jug having a volume of about 1 gallon (3.8 liters) using a low speed electric paddle mixer. Mixing ceased when the solution began to foam slightly.

Samples T and U

The permeable masses of Samples T and U comprised utility grade silicon nitride particulate (Elkem Materials, Inc.) having substantially all particle diameters smaller than about 75 microns. Furthermore, the binder composition was substantially the same as that employed in making the press mixture for Samples R and S above.

Samples V and W

The permeable masses for Samples V and W comprised a blend of silicon nitride and silicon carbide particulates. Specifically, the permeable masses comprised by weight about 50% utility grade silicon nitride particulate (Elkem Materials, Inc.) having substantially all particle diameters between about 23 microns and about 45 microns and the balance 500 grit 39 CRYSTOLON® super strong silicon carbide particulate (average particle diameter of about 17 microns, Norton Co., Worcester, Mass.). The above-described particle size distribution for the silicon nitride particulate was created by preparing an aqueous slurry of as-received silicon nitride particulate (–325 mesh, Elkem Materials, Inc.) having substantially all particles smaller than about 45 microns in diameter, allowing the particulates comprising the slurry to settle in accordance with Stokes' Law and decanting off the remaining suspension of water and fine particulate silicon nitride. Subsequent analysis of the particle size distribution of the settled particulate material using a MICROMERITICS® SEDIGRAPH 5100 particle size analyzer (Micromeritics Instrument Corp., Norcross, Ga.) revealed that a settling time of about 0.5 hour was sufficient to substantially completely eliminate the particles smaller than about 23 microns in diameter from the as-received silicon nitride powder.

Unlike Samples R–U, however, the binder system employed for fabricating the Sample V and W preforms comprised by weight about 51.6% of the previously described polyvinyl alcohol stock solution, about 9.7% of the 400 molecular weight polyethylene glycol, and the balance NYACOL® 2040 colloidal silica suspension (Nyacol Products, Inc.)

Samples X and Y

The Sample X and Y preforms featured a particulate blend comprising by weight about 50% silicon nitride particulate (Elkem Materials, Inc.) having substantially all particles smaller than about 45 microns in diameter and about 50% 500 grit 39 CRYSTOLON® SUPER STRONG silicon carbide particulate (average particle diameter of about 17 microns, Norton Co.). The binder system employed in fabricating the press mix for the Sample X and Y preforms was substantially the same as that employed for fabricating the Sample R–U preforms.

The dry pressed preforms were then debindered. Specifically, each preform was placed on an about ⅛ inch (3 mm) thick sheet of CARBORUNDUM® FIBERFRAX® ceramic paper which in turn was supported by a silicon carbide plate. The silicon carbide plate and its contents were then placed into an air atmosphere furnace and subjected to the following heating schedule. The preforms were heated in air from about 20° C. to a temperature of about 500° C. at a rate of about 50° C. per hour. After maintaining a temperature of about 500° C. for about 6 hours in air, the temperature was then increased to a temperature of about 1000° C. at a rate of about 100° C. per hour. After maintaining a temperature of about 1000° C. for about 4 hours in air, the temperature was then decreased to about 20° C. at a rate of about 100° C. per hour.

Figure 12:
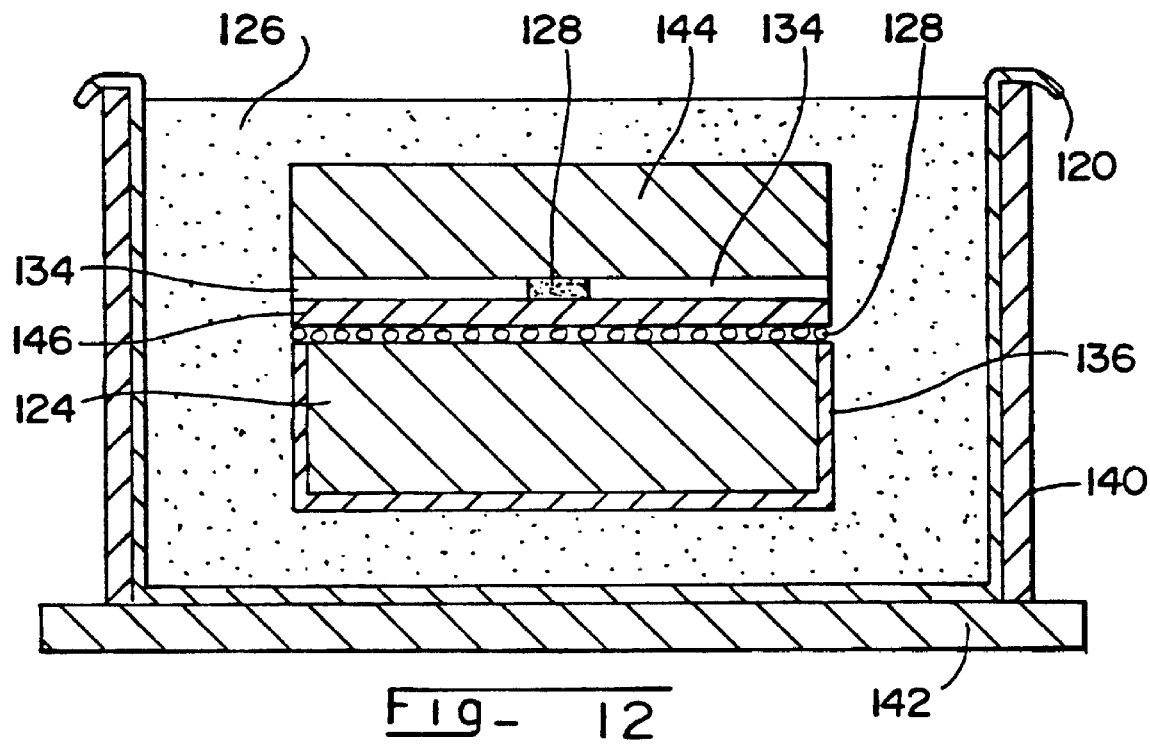
FIG. 12 is a cross-sectional schematic view of the lay-up employed in fabricating the metal matrix composite body of Example 9.
Figure 13:
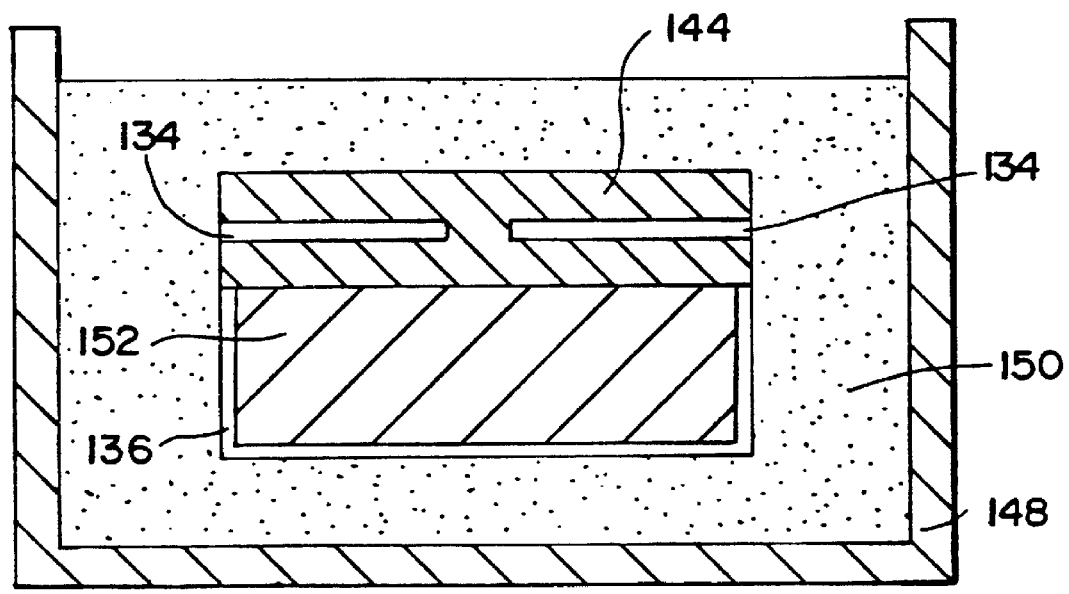
FIG. 13 is a cross-sectional schematic view of the lay-up employed in post-treating the formed metal matrix composite body of Example 9.

Three coats of DAG® 154 colloidal graphite slurry (Acheson Colloids Co., Port Huron, Mich.) was coated by means of a foam paintbrush an airbrush onto five sides of each preform in substantially the same manner as was described in Example 8, leaving one of the 4 inch (102 mm) square faces uncoated. A lay-up was then fabricated as follows. Referring to FIG. 12, an approximately 16 inch (406 mm) square graphite box 140 approximately 10 inches (254 mm) high and open on both ends was placed onto a graphite plate 142. The five enclosed sides of the box were then lined with a single sheet of GRAFOIL® graphite foil 120 (Union Carbide Co., Carbon Products Div., Cleveland, Ohio) having a thickness of about 15 mils (0.38 mm) by making strategically placed cuts and folds in the graphite foil sheet 120 to make a box. A particulate bedding admixture 126 comprising by weight about 10% F-69 glass frit (Fusion Ceramics, Inc., Carrollton, Ohio) and the balance 90 grit 38 ALUNDUM® alumina particulate (average particle size of about 216 microns, Norton Co., Worcester, Mass.) was poured into the graphite foil box 120 to a depth of about 1 inch (25 mm). The colloidal graphite 136 coated preforms 124 were then placed into the graphite foil box 120 on top of the particulate bedding admixture 126 with the uncoated side facing up. Samples R–Y comprised 8 of the 9 preform tiles so placed in graphite foil box 120. Magnesium particulate 128 (−50 mesh, atomized, Hart Corp., Tamaqua, Pa.) having substantially all particles smaller than about 300 microns in diameter was sprinkled evenly over the exposed surface of each preform 124 at a concentration of about 23 mg per square centimeter. A gating means comprising a sheet 134 of GRAFOIL® graphite foil having a thickness of about 15 mils (0.38 mm) and length and width dimensions substantially matching those of the preform and having a hole in its center of about 3/16 inch (5 mm) in diameter was then placed onto a sheet of metal 146 comprising by weight about 0.4–0.8% Si, <0.7% Fe, 0.15–0.40% Cu, <0.15% Mn, 0.8–1.2% Mg, 0.04–0.35% Cr, <0.25% Zn and the balance Al (Aluminum Association Alloy No. 6061) having a thickness of about 23 mils (0.6 mm) and overall dimensions substantially matching those of the preform 124. This assembly was then placed on top of the layer of magnesium particulate 128 on top of the preform 124 with the metal sheet 146 contacting the magnesium particulate 128. The hole in the graphite foil sheet 134 was then filled with additional magnesium particulate 128 (−50 mesh, Hart Corp.). An ingot of matrix metal 144 measuring about 4 inches (102 mm) square and weighing about 730 grams and having a composition as described in Table V was placed over each of the graphite foil sheet gating means 134. Additional particulate bedding material 126 was then poured into the graphite foil box 120 substantially completely burying each matrix metal ingot 144 to a depth of about 1 inch (25 mm) to complete the lay-up.

The lay-up was then placed into a controlled atmosphere furnace at about 20° C. The furnace door was closed and the furnace chamber atmosphere was evacuated to about 30 inches (762 mm) of mercury vacuum and then backfilled with commercially pure nitrogen gas to about atmospheric pressure. A nitrogen gas flow rate of about 250 cubic feet per hour (118 liters per minute) through the furnace chamber was thereafter established and maintained. The furnace temperature was then increased from about 20° C. to a temperature of about 200° C. at a rate of about 100° C. per hour. After maintaining a temperature of 200° C. for about 2 hours, the furnace temperature was then increased to a temperature of about 800° C. at a rate of about 100° C. per hour. After maintaining a temperature of about 800° C. for

TABLE V

| Sample | Powder Blend in Preform | Matrix Metal |
| --- | --- | --- |
| R | −45 μm $Si_3N_4$ | Al-5 Mg |
| S | −45 μm $Si_3N_4$ | Al-10 Si-5 Mg |
| T | −200 mesh $Si_3N_4$ | Al-5 Mg |
| U | −200 mesh $Si_3N_4$ | Al-10 Si-5 Mg |
| V | 50 wt % +23 μm $Si_3N_4$ 50 wt % 500 grit SiC | Al-10 Si-5 Mg |
| W | 50 wt % +23 μm $Si_3N_4$ 50 wt % 500 grit SiC | Al-12.5 Si-5 Mg |
| X | 50 wt % −45 μm $Si_3N_4$ 50 wt % 500 grit SiC | Al-10 Si-5 Mg |
| Y | 50 wt % −45 μm $Si_3N_4$ 50 wt % 500 grit SiC | Al-12.5 Si-5 Mg | about 45 hours, the temperature was then decreased to about 20° C. at a rate of about 100° C. per hour. After the furnace chamber had cooled to about 20° C., the furnace chamber was opened, the lay-up was retrieved and disassembled. Specifically, the particulate bedding material was removed using light hammer blows to reveal that the matrix metal ingots had at least partially spontaneously infiltrated the preforms to form metal matrix composite bodies having some residual uninfiltrated matrix metal remaining attached to one side of the formed metal matrix composite body.

The formed metal matrix composite bodies were then heat treated in substantially the same manner as the metal matrix composite body of Example 8 with the exception that the residual matrix metal was left attached to the metal matrix composite bodies during the heat treatment to provide a reservoir of metal to counter the propensity for shrinkage porosity to form during post-processing.

Knoop microhardness measurements were taken on heat treated Samples V, W and X. The results are reported in Table VI. Conversion of the Knoop microhardness values to the Rockwell A hardness scale was done using the hardness conversion chart found on page 122 of the ASM Metals Reference Book, Second Edition.

This Example therefore demonstrates the fabrication of a variety of metal matrix composite bodies comprising various permeable masses, spontaneously infiltrated by various matrix metals to form metal matrix composite bodies which may thereafter be heat treated at an elevated temperature. The Example furthermore demonstrates the concept of supplying additional matrix metal to the formed metal matrix composite body during the post-formation treatment process.

EXAMPLE 10

This Example demonstrates the fabrication of a heat treatable metal matrix composite body. In particular, this Example demonstrates the fabrication of a composite body by means of spontaneously infiltrating a permeable mass comprising a plurality of second materials with a molten matrix metal and subsequently heating the infiltrated mass to a temperature above the infiltration temperature so as to react the second materials to form a variety of reaction products. The permeable mass of the present example does not initially contain any substantially non-reactive filler material; however, the present Example also demonstrates the formation of

TABLE VI

| Sample | Knoop | Rockwell A Scale |
|--------|-------|------------------|
| V | 775 ± 53 | 81.9 |
| W | 753 ± 55 | 81.8 |
| X | 865 ± 113 | 84.4 | such a reinforcement filler wherein this substantially non-reactive reinforcement filler forms in situ as a result of the heat treatment process.

Most of the geometry of the lay-up employed in carrying out the spontaneous infiltration process of the present Example is shown schematically in cross-section in FIG. 12.

A series of preforms containing various ratios of second materials were fabricated as follows.

Sample AA

First a dry pressable powder mixture was prepared. Specifically, into an approximately 1 quart (0.95 liter) plastic jar was placed a mixture comprising by weight about 3 percent ground magnesium particulate (−325 mesh, Hart Corp., Tamaqua, Pa.) having substantially all particles smaller than about 45 microns in diameter and the balance comprising a second material which consisted essentially of utility grade silicon nitride particulate (−325 mesh, Elkem Materials, Inc., Pittsburgh, PA) having substantially all particles smaller than about 45 microns in diameter. About 5 percent of the weight of this mixture was added as CERACER® 642 free-flowing PT wax binder (Shamrock Corp., Newark, N.J.) was added to the mixture as a binder to yield between about 50 and 75 grams of raw material for dry pressing a preform. About half of the weight of this raw material, was then added to the contents of the plastic jar in the form of BURUNDUM® cylindrical ceramic grinding media (U.S. Stoneware, Mahwah, N.J.) each cylinder measuring about ½ inch (13 mm) in height by about ½ inch (13 mm) in diameter. The plastic jar was then sealed with its lid and the jar and its contents were then placed onto a rotating mill rack for about 16 hours to roll mix the contents of the jar. The roll-mixed powder was then passed through a 25 mesh screen (opening size of about 710 microns) separate the ceramic beads from the powder. The roll mixed powder was then placed into a steel pressing die and a preform tile measuring about 2 inches (51 mm) square by about 0.5 inch (13 mm) thick was uniaxially dry pressed under a maximum applied pressure of about 10 ksi (69 MPa).

Sample BB

Sample BB was prepared in substantially the same manner as was Sample AA with the exception that the second material itself comprised a mixture. Specifically, the second material for Sample BB comprised by weight about 25.8 percent 320 grit TETRABOR® boron carbide particulate (ESK Engineered Materials, Inc., New Canaan, Conn.) having an average particle diameter of about 32 microns and the balance the utility grade silicon nitride particulate (−325 mesh, Elkem Materials, Inc.).

Sample CC

Sample CC was prepared in substantially the same manner as was Sample BB with the exception that the second material comprised by weight about 51.5 percent of the 320 grit TETRABOR® boron carbide particulate (ESK Engineered Materials, Inc.) and the balance the utility grade silicon nitride particulate (−325 mesh, Elkem Materials, Inc.).

Sample DD

Sample DD was prepared in substantially the same manner as was Sample BB with the exception that the second material comprised by weight about 77.3 percent of the 320 grit TETRABOR® boron carbide particulate (ESK Engineered Materials, Inc.) and the balance the utility grade silicon nitride particulate (−325 mesh, Elkem Materials, Inc.).

Sample EE

The Sample EE preform was fabricated in substantially the same manner as was the Sample AA preform with the exception that the second material comprised 320 grit TETRABOR® boron carbide particulate (average particle diameter of about 32 microns, ESK Engineered Materials, Inc.) instead of the utility grade silicon nitride material.

The preforms were then coated with a colloidal graphite barrier material in substantially the same manner as was described in Example 8.

A lay-up was then fabricated as follows. The five interior sides of a graphite boat measuring about 9 inches (229 mm) square by about 4 inches (102 mm) high was lined with a single sheet of GRAFOIL® graphite foil material (Union Carbide Co., Carbon Products Division, Cleveland, Ohio) having a thickness of about 15 mils (0.38 mm) by making strategically placed cuts and folds in the graphite foil material. The colloidal graphite 136 coated preforms 124 were then placed onto the floor of the graphite foil lined boat with the uncoated side facing up (e.g., towards the opening of the boat). Referring to FIG. 12, which adequately illustrates the remaining components of the lay-up, a particulate admixture 126 comprising by weight about 2.5 percent F-69 glass frit (Fusion Ceramics, Inc., Carrollton, Ohio) and the balance 90 grit 38 ALUNDUM® aluminum oxide particulate (Norton Co., Worcester, Mass.) having an average particle size of about 216 microns, was poured into the graphite foil 120 lined boat. Magnesium particulate 128 (−50+100 mesh, ground, Hart Corp.) having substantially all particles between about 150 and about 300 microns in diameter was sprinkled evenly over the exposed surface of each preform 124 until a total of about 0.6 grams of magnesium particulate had been supplied to the exposed surface of each preform 124. A gating means comprising a sheet 134 of GRAFOIL® graphite foil material (Union Carbide Co.) having a thickness of about 15 mils (0.38 mm) and measuring about 2.25 inches (57 mm) square and having a hole in its center of about ³⁄₁₆ inch (5 mm) in diameter was then placed in rotational alignment flat onto a plate of metal 146 comprising by weight about 0.4–0.8% Si, <0.7% iron, 0.15–0.40% Cu, <0.15% Mn, 0.8–1.2% Mg, 0.04–0.35% Cr, <0.25% Zn and the balance Al (Aluminum Association Alloy No. 6061) having a thickness of about 32 mils (0.8 mm) and measuring about 2 inches (51 mm) square. This assembly comprising this sheet 134 of graphite foil contacting this aluminum alloy plate 146 was then placed on top of the layer of magnesium particulate 128 on top of the preform 124 with the metal plate 146 contacting the magnesium particulate 128. The hole in the graphite foil material 134 was then filled with additional ground magnesium particulate 128 (−50+100 mesh, Hart Corp.). An ingot of matrix metal 144 measuring about 2 inches (51 mm) square by about 1 inch (25 mm) thick and weighing about 181 grams and comprising by weight about 10% silicon and the balance aluminum was placed over each of the graphite foil gating means 134. a particulate admixture 126 comprising by weight about 2.5 percent F-69 glass frit (Fusion Ceramics, Inc., Carrollton, Ohio) and the balance 90 grit 38 ALUNDUM® aluminum oxide particulate (Norton Co., Worcester, Mass.) having an average particle size of about 216 microns, was poured into the graphite foil 120 lined boat substantially completely burying each matrix metal ingot 144 to a depth of about 0.5 inch (13 mm) to complete the lay-up.

The lay-up was then placed into a controlled atmosphere furnace at a temperature of about 25° C. The furnace chamber was closed and the furnace chamber atmosphere was evacuated to a final pressure of about 28 mm of mercury and then backfilled with commercially pure nitrogen gas to about atmospheric pressure. A nitrogen gas flow rate of about 5 standard liters per minute (SLPM) was thereafter established and maintained flowing through the furnace chamber. The furnace temperature was then increased from about 25° C. to a temperature of about 400° C. at a rate of about 50° C. per hour. After maintaining a temperature of about 400° C. for about 10 hours, the furnace temperature was then increased to a temperature of about 800° C. at a rate of about 100° C. per hour. After maintaining a temperature of about 800° C. for about 15 hours, the furnace temperature was decreased to a temperature of about 700° C. at a rate of about 200° C. per hour. At a temperature of about 700° C., the furnace chamber was then opened and the graphite boat and its contents were removed from the furnace chamber and placed onto a water cooled copper quench plate to directionally solidify the formed metal matrix composite bodies. After the graphite boat and its contents had cooled to substantially room temperature (e.g, about 25° C.), the preforms were recovered from the graphite boat. Inspection of each preform revealed that each had been at least partially infiltrated with matrix metal to form a metal matrix composite material. Each of the formed metal matrix composite bodies had some residual uninfiltrated matrix metal remaining attached to one side of the formed body.

Each of the formed metal matrix composite bodies were then sectioned in half using a diamond saw and one of each pair of sectioned bodies were heat treated in substantially the same manner as was described in Example 9 (i.e., heat treated with the residual body of uninfiltrated matrix metal remaining attached to the metal matrix composite material.

The heat treated and non-heat treated halves of the Sample CC composite material were then characterized in terms of chemical composition using qualitative x-ray diffraction analysis substantially as was described in Example 8. Table VII shows the relative change in concentration of the various chemical constituents of the formed metal matrix composite body as a result of the heat treatment step. Specifically, Table VI reports the relative x-ray intensities for each of the detected substances with each x-ray analysis being normalized to an intensity of 100 for the largest x-ray peak. Examination of Table VII suggests a complex interaction of many of

TABLE VII

Semi-quantitative Chemical Analysis by X-ray Diffraction:
Effect of Heat Treatment on Normalized X-ray Peak Intensity

| Constituent of Composite | As-Infiltrated | After Heat-Treatment |
|---|---|---|
| Al | 100 | 77 |
| Si | 19 | 100 |
| $Si_3N_4$ | 5 | |

TABLE VII-continued

Semi-quantitative Chemical Analysis by X-ray Diffraction:
Effect of Heat Treatment on Normalized X-ray Peak Intensity

| Constituent of Composite | As-Infiltrated | After Heat-Treatment |
|---|---|---|
| $\beta$-$Si_3N_4$ | 2 | |
| $B_4C$ | 6 | 4 |
| AlN | 2 | 53 |
| SiC | | 20 |
| $AlB_{10}$ | | 11 | the metal matrix composite constituents as a result of the elevated temperature heat treatment. Specifically, the data show an increase of the silicon concentration which may be attributable to reaction of aluminum with silicon nitride; consumption of silicon nitride to below the x-ray diffraction detection limit; a significant increase in the concentration of aluminum nitride and the appearances of silicon carbide and aluminum boride (specifically, $AlB_{10}$) phases upon heat treatment.

This Example thus further demonstrates the fabrication of a heat treatable metal matrix composite body. In particular, this Example demonstrates the fabrication of a composite body by means of spontaneously infiltrating a permeable mass with a molten matrix metal. The permeable mass consists essentially of materials which are reactive at elevated temperatures such that subsequently heating the infiltrated mass to a temperature above the infiltration temperature causes the materials making up the permeable mass to react to form a variety of reaction products. Moreover, this Example demonstrates that one or more such reaction products may become reactants for an additional, secondary reaction in what may be a complex sequence of chemical reactions. Finally, the present Example demonstrates that substantially non-reactive reinforcement filler material such as silicon carbide may be absent initially from a metal matrix composite body but subsequently formed in situ as a result of an elevated temperature heat treatment process.

While the preceding embodiments have been described with particularity and demonstrate the utility of the invention, various modifications should be considered to be within the scope of the claims appended hereto.

We claim:

1. A method of forming a metal matrix composite body, comprising:

forming a permeable mass comprising at least one material selected from the group consisting of a second material and a precursor to a second material, said second material consisting essentially of at least one member selected from the group consisting of carbides, nitrides and oxides;

infiltrating molten matrix metal into at least a portion of said permeable mass to form an at least partially infiltrated mass comprising said at least one material embedded by said matrix metal;

thereafter heating said at least partially infiltrated mass to a temperature which is higher than the temperature at which the permeable mass was infiltrated;

reacting at least one component of said at least partially infiltrated mass with said material to form at least one reaction product in at least a portion of said at least partially infiltrated mass;

maintaining said higher temperature for a time sufficient to permit a desirable amount of said reaction to occur at said higher temperature; and cooling said at least partially infiltrated mass.

2. The method of claim 1, wherein said permeable mass further comprises at least one filler material.

3. The method of claim 1, wherein said at least one material comprises at least two materials.

4. The method of claim 3, wherein at least two said materials comprise silicon nitride and boron carbide.

5. The method of claim 1, wherein at least a majority of said reaction occurs at said higher temperature.

6. The method of claim 1, wherein said reaction results in an increased volume of ceramic phases in said metal matrix composite body.

7. The method of claim 1, wherein said reaction produces a total net volume increase of said at least partially infiltrated mass.

8. The method of claim 1, wherein said reaction produces a total net volume decrease of said at least partially infiltrated mass.

9. The method of claim 8, further comprising supplying a reservoir of additional matrix metal to said metal matrix composite body during said heating and maintaining steps.

10. The method of claim 1, wherein said infiltration comprises at least one class of infiltration selected from the group consisting of spontaneous infiltration, pressure-assisted infiltration and vacuum-assisted infiltration.

11. The method of claim 1, wherein said infiltration comprises spontaneous infiltration.

12. The method of claim 11, further comprising an infiltrating atmosphere which is present at least at some point during said spontaneous infiltration step.

13. The method of claim 12, wherein said matrix metal comprises aluminum and said infiltrating atmosphere comprises a nitrogen-containing gas.

14. The method of claim 1, further comprising an atmosphere selected from the group consisting of an oxygen-containing atmosphere and a nitrogen-containing atmosphere which is present at least a some point during said heating and maintaining steps.

15. The method of claim 14, wherein said nitrogen-containing atmosphere comprises $N_2$.

16. A method of forming a metal matrix composite body, comprising:

forming a permeable mass comprising silicon nitride and a carbon source;

spontaneously infiltrating molten matrix metal into at least a portion of said permeable mass to form an at least partially infiltrated mass comprising said silicon nitride and said carbon source embedded by said matrix metal;

heating said at least partially infiltrated mass to a temperature which is higher than the temperature at which said permeable mass was at least partially spontaneously infiltrated;

reacting said matrix metal with said silicon nitride and said carbon source to form at least one reaction product in at least a portion of said at least partially infiltrated mass;

maintaining said higher temperature for a time sufficient to permit at least a majority of said reaction to occur at said higher temperature; and cooling said at least partially infiltrated mass.

17. The method of claim 16, wherein said permeable mass further comprises at least one filler material.

18. The method of claim 17, wherein said at least one filler material comprises silicon carbide.

19. The method of claim 16, wherein said carbon source comprises at least one substance selected from the group consisting of elemental carbon and boron carbide.

20. The method of claim 16, wherein said matrix metal comprises aluminum.

21. The method of claim 16, further comprising an infiltrating atmosphere comprising nitrogen.

22. The method of claim 16, further comprising an air atmosphere which is present at least at some point during said heating and said maintaining steps.

23. The method of claim 16, wherein said higher temperature comprises a temperature of at least about 1200° C.

24. The method of claim 16, wherein said temperature at which said spontaneous infiltration occurs comprises a temperature in a range from about 800° C. to about 1000° C.

25. A method of forming a metal matrix composite body, comprising:

forming a permeable mass of at least one material selected from the group consisting of a filler material and a preform;

mixing at least one second material into at least a portion of said permeable mass;

spontaneously infiltrating molten matrix metal into said permeable mass to form a metal matrix composite body in at least a portion of said permeable mass;

thereafter heating said spontaneously infiltrated mass to a temperature higher than that temperature at which said permeable mass was spontaneously infiltrated;

forming at least one reaction product in at least a portion of said spontaneously infiltrated mass; and cooling said spontaneously infiltrated mass, at least a portion of which has been modified by said reaction product.

26. The method of claim 25, wherein said at least one reaction product comprises a reaction product of said matrix metal and said at least one second material.

27. The method of claim 25, wherein said at least one reaction product comprises a reaction product of said at least one second material and at least one member selected from the group consisting of said filler material and another of said at least one second material.

28. The method of claim 25, wherein said at least one reaction product comprises at least one member selected from the group consisting of a metallic material and a ceramic material.

29. The method of claim 25, wherein said matrix metal comprises aluminum and said at least one reaction product comprises an intermetallic compound.

30. The method of claim 25, wherein said at least one second material comprises at least one member selected from the group consisting of boron carbide and silicon nitride.

31. The method of claim 25, wherein an infiltrating atmosphere communicates with at least one of said permeable mass and said matrix metal at least at some point during said spontaneous infiltration.

32. The method of claim 31, further comprising the step of supplying at least one of an infiltration enhancer precursor and an infiltration enhancer to at least one of said matrix metal, said permeable mass and said infiltrating atmosphere.

33. The method of claim 32, wherein said infiltration enhancer precursor comprises a material selected from the group consisting of magnesium, strontium, calcium and zinc and said infiltrating atmosphere comprises an atmosphere selected from the group consisting of oxygen and a nitrogen containing atmosphere.

34. A method of forming a metal matrix composite body, comprising:

providing a permeable mass comprising at least one filler material and at least one second material;

infiltrating a molten matrix metal into at least a portion of said permeable mass;

thereafter heating said at least partially infiltrated mass to a temperature higher than the temperature at which said molten matrix metal at least partially infiltrated said permeable mass;

maintaining said higher temperature for a time sufficient to permit at least some reaction of said at least one second material with at least one member selected from the group consisting of said filler material and said matrix metal; and cooling said at least partially infiltrated mass.

35. The method of claim 34, wherein said reaction forms at least one reaction product in at least a portion of said at least partially infiltrated mass.

36. The method of claim 35, wherein a volume of said at least one reaction product is greater than the sum of the volumes of said second material and said at least one member with which said second material reacts.

37. The method of claim 35, wherein a volume of said at least one reaction product is less than the sum of the volumes of said second material and said at least one member with which said second material reacts.

38. The method of claim 37, further comprising contacting said at least partially infiltrated mass to at-least one source of additional matrix metal during said heating and maintaining steps.

39. The method of claim 37, wherein said volume of said at least one reaction product is greater than said volume of said at least one second material.

40. The method of claim 34, wherein said infiltrating comprises at least one technique selected from the group consisting of spontaneous infiltration, pressure infiltration and vacuum infiltration.

41. The method of claim 34, wherein said permeable mass is shaped as a self-supporting preform.

42. The method of claim 34, wherein at least a portion of said reaction occurs during said infiltrating step.

43. The method of claim 42, wherein at least a majority of said reaction occurs during at least one of said heating and maintaining steps.

44. The method of claim 34, wherein said second material comprises at least one member selected from the group consisting of carbides, nitrides and oxides.

45. The method of claim 34, wherein said second material comprises at least one member selected from the group consisting of boron carbide and silicon nitride.

46. The method of claim 34, wherein said second material comprises at least one member selected from the group consisting of a metal and a precursor to a metal.

47. The method of claim 34, wherein said second material comprises at least one member selected from the group consisting of carbon and a ceramic material.

48. The method of claim 34, wherein said second material comprises at least one oxide selected from the group consisting of copper oxide, iron oxide, nickel oxide, titanium dioxide, silicon dioxide and molybdenum trioxide.

49. The method of claim 34, wherein said permeable mass is substantially completely infiltrated prior to heating to said higher temperature.

50. A method for forming a metal matrix composite body, comprising:

providing a permeable mass comprising at least one filler material and at least one precursor to a second material;

infiltrating a molten matrix metal into at least a portion of said permeable mass;

thereafter heating said at least partially infiltrated mass to a temperature higher than the temperature at which said molten matrix metal at least partially infiltrated said permeable mass;

maintaining said higher temperature for a time sufficient to form in at least a portion of said at least partially infiltrated mass at least one reaction product of at least one member selected from the group consisting of said filler material and said matrix metal; and cooling said at least partially infiltrated mass.

51. The method of claim 50, wherein said precursor to a second material comprises a preceramic polymer.

52. The method of claim 50, wherein said precursor to a second material comprises at least one member selected from the group consisting of mullite and aluminum titanate.

* * * * *